US011493990B2

(12) United States Patent
Kakizawa et al.

(10) Patent No.: US 11,493,990 B2
(45) Date of Patent: Nov. 8, 2022

(54) SIMULATION SYSTEM, PROCESSING METHOD, AND INFORMATION STORAGE MEDIUM

(71) Applicant: BANDAI NAMCO ENTERTAINMENT INC., Tokyo (JP)

(72) Inventors: Takahiro Kakizawa, Yokohama (JP); Masaru Aita, Tokyo (JP); Shusuke Miura, Koshigaya (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/245,945

(22) Filed: Jan. 11, 2019

(65) Prior Publication Data

US 2019/0220089 A1 Jul. 18, 2019

Related U.S. Application Data

(63) Continuation of application No. PCT/JP2017/024794, filed on Jul. 6, 2017.

(30) Foreign Application Priority Data

Jul. 13, 2016 (JP) .............................. JP2016-138929

(51) Int. Cl.
*G06F 3/01* (2006.01)
*A63F 13/212* (2014.01)
(Continued)

(52) U.S. Cl.
CPC .............. *G06F 3/012* (2013.01); *A63B 69/18* (2013.01); *A63F 13/211* (2014.09);
(Continued)

(58) Field of Classification Search
CPC .......... G02B 27/017; G02B 27/00–648; G02B 30/00–60; G02B 2027/0105–0198;
(Continued)

(56) References Cited

U.S. PATENT DOCUMENTS 5,662,523 A * 9/1997 Yasumaru ............... A63F 13/12
463/30
2002/0158888 A1 10/2002 Kitsutaka
(Continued)

FOREIGN PATENT DOCUMENTS

JP H11-161814 A 6/1999
JP H11-309269 A 11/1999
(Continued)

OTHER PUBLICATIONS

Oka Ichimon, Yuji, "Oculus Rift de Ore no Yome to Aeru Hon," 1st Edition, Shoeisha Co., Ltd., Dec. 15, 2014, pp. 20-22, 43, 190-192, 208-218, 220.
(Continued)

*Primary Examiner* — Amr A Awad
*Assistant Examiner* — Aaron Midkiff
(74) *Attorney, Agent, or Firm* — Oliff PLC

(57) ABSTRACT

A simulation system includes a processor including hardware. The processor performs a moving body process of performing a process of moving a moving body corresponding to a user wearing an HMD in a virtual space, a virtual camera control process of controlling a virtual camera moving in accordance with a movement of the moving body, and a display process of generating an image as viewed from the virtual camera in the virtual space as a display image of the head mounted display. The processor performs, in the display process, an image effect process for motion sickness prevention as a process of blurring, compared with a display object in a given distance range from the virtual camera, an image of a display object in a distance range farther than the given distance range to generate the display image.

18 Claims, 25 Drawing Sheets

(51) Int. Cl.
*A63F 13/5255* (2014.01)
*A63F 13/211* (2014.01)
*A63F 13/807* (2014.01)
*G06T 15/20* (2011.01)
*A63F 13/25* (2014.01)
*A63F 13/57* (2014.01)
*G06T 7/73* (2017.01)
*A63B 69/18* (2006.01)
*G02B 27/01* (2006.01)
*G06T 5/00* (2006.01)
*A63B 71/06* (2006.01)

(52) U.S. Cl.
CPC ............ *A63F 13/212* (2014.09); *A63F 13/25* (2014.09); *A63F 13/5255* (2014.09); *A63F 13/57* (2014.09); *A63F 13/807* (2014.09); *G02B 27/017* (2013.01); *G06T 5/002* (2013.01); *G06T 7/73* (2017.01); *G06T 15/20* (2013.01); *A63B 2071/0644* (2013.01); *A63F 2300/8041* (2013.01); *G02B 2027/0187* (2013.01)

(58) Field of Classification Search
CPC ............ G02B 2027/0127; G02B 7/002; G02B 2027/0187; G02B 2027/012–0129; G02B 2027/0147; G06F 1/163; G06F 3/011–013; G06F 3/012; A63F 2300/1062; A63F 13/00–98; A63F 13/525; A63F 2300/8041; A63F 2300/8082; G06T 7/73; G06T 15/20; G06T 5/002; A63B 69/18; A63B 2071/0644

USPC .......................................................... 345/8
See application file for complete search history.

(56) References Cited

U.S. PATENT DOCUMENTS

| | | |
|---|---|---|
| 2004/0085356 A1 | 5/2004 | Kake et al. |
| 2007/0082742 A1* | 4/2007 | Takizawa .............. A63F 13/525 463/43 |
| 2007/0285795 A1* | 12/2007 | Tsan ................... G02B 27/0172 359/630 |
| 2014/0364228 A1 | 12/2014 | Rimon |
| 2016/0234482 A1* | 8/2016 | Bickerstaff .......... H04N 13/239 |
| 2016/0260258 A1* | 9/2016 | Lo ....................... G02B 27/0172 |
| 2017/0046578 A1* | 2/2017 | Phillips .............. H04N 5/23218 |
| 2017/0228931 A1* | 8/2017 | Parker ................. G02B 27/017 |

FOREIGN PATENT DOCUMENTS

| | | |
|---|---|---|
| JP | 2001-175884 A | 6/2001 |
| WO | 02/095684 A1 | 11/2002 |
| WO | 2014/197876 A2 | 12/2014 |

OTHER PUBLICATIONS

Sep. 5, 2017 International Search Report issued in International Patent Application No. PCT/JP2017/024794.

* cited by examiner

FIG. 16

| GAME STAGE | FOG COLOR | LEVEL OF FOG PROCESS | ---------- |
|:---:|:---:|:---:|:---:|
| STA | CA | FA | ---------- |
| STB | CB | FB | ---------- |
| STB | CC | FC | ---------- |
| ǀ | ǀ | ǀ | ǀ |

| DISPLAY OBJECT | VISIBILITY ENHANCING FLAG |
|---|---|
| OBA | FLA |
| OBB | FLB |
| OBC | FLC |
| ⋮ | ⋮ |

| PLAY LEVEL | IMAGE EFFECT PROCESS ON/OFF FLAG | EFFECT LEVEL |
|---|---|---|
| BEGINNER | ON | EFA |
| ELEMENTARY LEVEL | ON | EFB |
| PRE-INTERMEDIATE | ON | EFC |
| INTERMEDIATE | ON | EFD |
| UPPER INTERMEDIATE | ON | EFE |
| SKILLED | OFF | — |
| EXPERT | OFF | — |

SIMULATION SYSTEM, PROCESSING METHOD, AND INFORMATION STORAGE MEDIUM

CROSS REFERENCE TO RELATED APPLICATION

This application is a continuation of International Patent Application No. PCT/JP2017/024794, having an international filing date of Jul. 6, 2017, which designated the United States, the entirety of which is incorporated herein by reference. Japanese Patent Application No. 2016-138929 filed on Jul. 13, 2016 is also incorporated herein by reference in its entirety.

BACKGROUND

The disclosure relates to a simulation system, a processing method, an information storage medium, and the like.

Simulation systems using head mounted displays (HMDs) have conventionally been known. The system enables a user wearing the HMD on his or her head to experience a virtual reality (VR) world by watching an image displayed on a screen of the HMD. Japanese Patent Application Publication No. 1999-309269 discloses an example of a conventional technique of such a simulation system.

In the simulation system using an HMD, an image as viewed from a virtual camera in a virtual space is displayed on the HMD. With such an image displayed on the HMD, a vast VR space spreads over the entire field of view of a user, whereby virtual reality felt by the user can be largely improved.

Thus, the simulation systems using HMDs can provide users with contents offering high quality and a great sense of immersion. However, even if such a content is provided, the user cannot play the game for a long period of time, when he or she feels what is known as 3D sickness. Furthermore, the user may not even play the game again to avoid 3D sickness, no matter how attractive the content is.

3D sickness is caused by discrepancy between the feeling sensed by the user's brain in the virtual space and the feeling sensed by the user's body in a real space, and the like. When an image as viewed from the virtual camera is thus directly displayed on the HMD, the brain perceives a state where all of the display objects that are at close and far positions in a scenery of the virtual space are clearly seen, and tries to get information about all of them, resulting in too much information causing 3D sickness. Such occurrence of 3D sickness would make it difficult for the user to play a game for a long period of time or even make the user hesitate to play the game again, and thus compromises the attractiveness and utilization rate of the simulation system.

BRIEF DESCRIPTION OF THE DRAWINGS

FIG. 16 is a diagram illustrating a fog process performed as the image effect process according to the present embodiment.

DESCRIPTION OF EXEMPLARY EMBODIMENTS

Figure 1:
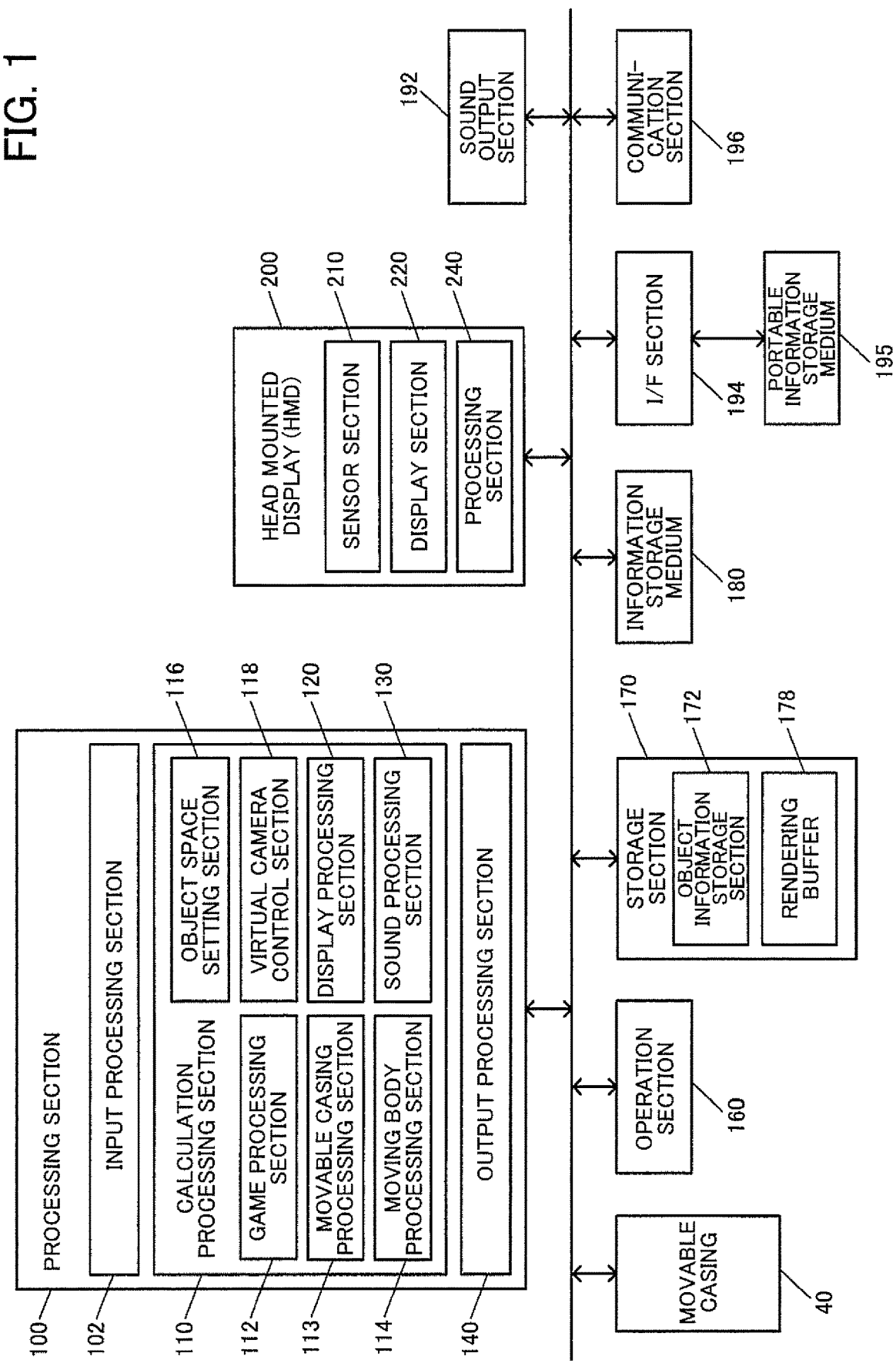
FIG. 1 is a block diagram illustrating a configuration example of a simulation system according to the present embodiment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, a simulation system, a processing method, an information storage medium, and the like that can effectively prevent a user from feeling 3D sickness can be provided for a system using a head mounted display.

In accordance with one of some embodiments, there is provided a simulation system comprising a processor including hardware, the processor being configured to perform a moving body process of performing a process of moving a moving body corresponding to a user wearing a head mounted display in a virtual space;

a virtual camera control process of controlling a virtual camera moving in accordance with a movement of the moving body; and a display process of generating an image as viewed from the virtual camera in the virtual space as a display image of the head mounted display, in the display process, the processor performs a blurring process as an image effect process for motion sickness prevention, the blurring process blurring, compared with a display object in a given distance range from the virtual camera, an image of a display object in a distance range farther than the given distance range to generate the display image.

As a result, in some embodiments, a process of moving a moving body corresponding to a user in a virtual space is performed, and an image as viewed from the virtual camera moving in accordance with a movement of the moving body is generated as a display image of the head mounted display. An image effect process for motion sickness prevention is performed as a process of blurring, compared with a display object in a given distance range from the virtual camera, an image of a display object in a distance range farther than the given distance range. With this configuration, a display object in a distance range far from the virtual camera is displayed as a blurred image. Thus, the user can be prevented from setting his or her line-of-sight to such display objects. Thus, the simulation system and the like that can effectively prevent the user from feeling 3D sickness can be provided for the system using the head mounted display.

In accordance with one of some embodiments, there is provided the simulation system, wherein in the display process, the processor may perform a depth of field process as the image effect process.

As a result, in some embodiments, with this configuration, the depth of field process which is generally recommended not to be used is effectively used so that an in-focus image can be generated for a display object in a given distance range, and an out-of-focus blurred image can be generated for a display object in a distance range farther than the given distance range.

In accordance with one of some embodiments, there is provided the simulation system, wherein in the display process, the processor may perform the depth of field process in which the given distance range is included in an in-focus range of a depth of field, and the blurring process is not performed in a region more on a near side than the in-focus range as viewed from the virtual camera and is performed in a region more on a far side than the in-focus range.

As a result, in some embodiments, with this configuration, an in-focus image can be generated for a display object in an in-focus range or a region closer than the in-focus range, and an out-of-focus blurred image can be generated for a display object in a region farther than the in-focus range.

In accordance with one of some embodiments, there is provided the simulation system, wherein in the display process, the processor may perform changing a width of the in-focus range of the depth of field in accordance with a movement status of the moving body.

As a result, in some embodiments, with this configuration, the image effect process for motion sickness prevention appropriate for the movement status of the moving body can be implemented by using the depth of field process.

In accordance with one of some embodiments, there is provided the simulation system, wherein in the display process, the processor may perform a fog process as the image effect process.

As a result, in some embodiments, with this configuration, for example, the image effect process for motion sickness prevention can be implemented with a fog process of blurring a display object in a distance range farther than the given distance range.

In accordance with one of some embodiments, there is provided the simulation system, wherein in the display process, the processor may perform the image effect process in which the blurring process is not performed on a display object determined to be intersecting with a line segment with a given length extending in the line-of-sight direction from the virtual camera in a process of determining whether collision with the line segment has occurred, and the blurring process is performed on other display objects.

As a result, in some embodiments, with this configuration, the image effect process for motion sickness prevention can be implemented through a simple process in which the blurring process is not performed on a display object that intersects with the line segment with a limited length, and is performed on the other display object.

In accordance with one of some embodiments, there is provided the simulation system, wherein the given distance range may be a range set based on a virtual visual distance of the head mounted display.

As a result, in some embodiments, with this configuration, the blurring process is not performed on a display object in a distance range set based on the virtual visual distance based on an assumption that the user can set his or her line-of-sight to such a display object without feeling 3D sickness, whereby a more natural display image can be displayed on the head mounted display.

In accordance with one of some embodiments, there is provided the simulation system, wherein the given distance range may be a range of distance between 0.75 m and 3.5 m from the virtual camera, and in the display process, the processor may not perform the blurring process on a display object in the given distance range, and may perform the blurring process on a display object in the distance range farther than the given distance range.

As a result, in some embodiments, with this configuration, based on a knowledge that the user can frequently set the line-of-sight to a display object in a distance range between 0.75 m and 3.5 m or gaze at the object for a long period of time without feeling eye tiredness, the given distance range in which the blurring process is not performed can be set.

In accordance with one of some embodiments, there is provided the simulation system, wherein in the display process, the processor may perform skipping the blurring process on a predetermined display object in the distance range father than the given distance range, or performing the blurring process on the predetermined display object with a blurring level lower than a blurring level of the blurring process on other display objects in the distance range.

As a result, in some embodiments, with this configuration, for a predetermined display object positioned in the distance range farther than the given distance range, the blurring process is not performed or is performed with a lower blurring level. Thus, the display object can be prevented from being less visually recognizable by the user due to the blurring process.

In accordance with one of some embodiments, there is provided the simulation system, wherein in the display process, the processor may perform a process of enhancing visibility of a predetermined display object in the distance range farther than the given distance range to be higher than visibility of other display objects in the distance range.

As a result, in some embodiments, with this configuration, the visibility enhancing process is performed on a predetermined display object positioned in a distance range farther than the given distance range, and thus the user can appropriately visually recognize the display object.

In accordance with one of some embodiments, there is provided the simulation system, wherein in the display process, the processor may perform, as the process of enhancing visibility, at least one of a size change process, a luminance change process, a color tone change process, and a depth value change process on the predetermined display object.

As a result, in some embodiments, with this configuration, the visibility enhancing process can be performed on a display object by changing the size, the luminance, the color tone, and/or the depth value of the display object.

In accordance with one of some embodiments, there is provided the simulation system, wherein the processor may be configured to perform an input process of acquiring tracking information for point-of-view information about the user wearing the head mounted display, and in the virtual camera control process, the processor may perform changing a position and/or orientation of the virtual camera based on the tracking information.

As a result, in some embodiments, with the position and/or the orientation of the virtual camera thus changed based on the tracking information for the point-of-view information about the user, a display image with enhanced virtual reality can be displayed on the head mounted display. Even when the position and/or the orientation of the virtual camera is thus changed based on the tracking information, the image effect process for motion sickness prevention is performed so that the user can be effectively prevented from feeling 3D sickness.

In accordance with one of some embodiments, there is provided the simulation system, wherein in the display process, the processor may perform setting the image effect process to be ON or OFF or setting an effect level of the image effect process, based on a status on a change in a line-of-sight direction or point-of-view position of the virtual camera, a status on a change in a movement status of the moving body, a status on a gaze location or a gaze target of the virtual camera, or a game status.

As a result, in some embodiments, with this configuration, the image effect process can be set to be ON or OFF, or the effect level of the image effect process can be changed based on various statuses.

In accordance with one of some embodiments, there is provided the simulation system, wherein in the display process, the processor may perform setting the image effect process to be ON or OFF or setting an effect level of the image effect process based on a play level of the user.

As a result, in some embodiments, with this configuration, the image effect process can be set to be ON or OFF, or the effect level of the image effect process can be changed based on the play level of the user.

In accordance with one of some embodiments, there is provided the simulation system, wherein the play level of the user may be determined based on tracking information obtained by tracking a movement of a head of the user or play history information about the user.

As a result, in some embodiments, with this configuration, the play level of the user can be determined by effectively using the head tracking information and/or the play history information about the user.

In accordance with one of some embodiments, there is provided the simulation system, wherein in the display process, the processor may perform setting the image effect process to be ON or OFF or setting an effect level of the image effect process based on information set by the user or play history information about the user.

As a result, in some embodiments, with this configuration, the image effect process can be set to be ON or OFF, or the effect level of the image effect process can be changed based on the setting information input by the user, the play history information about the user, and the like.

In accordance with one of some embodiments, the simulation system may further comprise a movable casing configured to change a play position of the user in accordance with a movement status of the moving body.

As a result, in some embodiments, with this configuration, the user can feel a change in the movement status of the moving body with the movable casing changing the play position of the user, whereby 3D sickness and the like can be effectively prevented.

In accordance with one of some embodiments, there is provided a processing method comprising:

performing a moving body process of performing a process of moving a moving body corresponding to a user wearing a head mounted display in a virtual space;

performing a virtual camera control process of controlling a virtual camera moving in accordance with a movement of the moving body; and performing a display process of generating an image as viewed from the virtual camera in the virtual space as a display image of the head mounted display, in the display process, performing a blurring process as an image effect process for motion sickness prevention the blurring process blurring, compared with a display object in a given distance range from the virtual camera, an image of a display object in a distance range farther than the given distance range to generate the display image.

Exemplary embodiments are described below. Note that the following exemplary embodiments do not in any way limit the scope of the content defined by the claims laid out herein. Note also that all of the elements described in the present embodiment should not necessarily be taken as essential elements.

1. Simulation System

FIG. 1 is a block diagram illustrating a configuration example of a simulation system (a simulator, a game system) according to the present embodiment. The simulation system according to the present embodiment is a system that simulates Virtual Reality (VR) for example, and can be applied to various systems such as a game system providing game contents, a real-time simulation system including a sports event simulator and a driving simulator, a content providing system that provides a content such as a movie, or an operating system for implementing a remote controlled operation. The simulation system according to the present embodiment is not limited to the configuration illustrated in FIG. 1, and can be modified in various ways including omitting some of its components (sections) or adding another component.

A movable casing 40 (a casing in broad sense) is what is known as an arcade casing and the like for example, and serves as an outer housing for a simulation system device. The movable casing 40 may be a cockpit casing (experience casing) for a robot game, a car game, or an aircraft game, or may be a casing for a card game. The movable casing 40 serves as a main body portion of the simulation system, and is provided with various devices and structures for implementing the simulation system. The movable casing 40 changes a play position of a user and the like. For example, the movable casing 40 changes the play position of the user in accordance with the movement status of the moving body. Specifically, the play position of the user is changed in accordance with a change in the speed and/or acceleration of the moving body, a change in the traveling direction of the moving body, a status of a course on which the moving body moves, and the like. The movable casing 40 will be described in detail later.

An operation section 160 is used by a user (player) to input various types of operation information (input information). The operation section 160 can be implemented by various operation devices such as an operation button, a direction designating key, a joystick, a handle, a pedal, and a lever for example. For example, in FIG. 4 described later, the operation section 160 is implemented with operation levers 161 and 162, an accelerator pedal 163, and a brake pedal 164.

A storage section 170 stores therein various types of information. The storage section 170 functions as a work area for a processing section 100, a communication section 196, and the like. The storage section 170 stores therein a game program and game data required for executing the game program. The function of the storage section 170 can be implemented by a semiconductor memory (dynamic random access memory (DRAM), video RAM (VRAM)), a hard disk drive (HDD), a solid state drive (SSD), an optical disc device, or the like. The storage section 170 includes an object information storage section 172 and a rendering buffer 178.

An information storage medium 180 (computer readable medium) stores therein a program, data, and the like. The function of the information storage medium 180 can be implemented by an optical disc (a digital versatile disc (DVD), a Blu-ray disc (BD), a compact disc (CD)), an HDD, a semiconductor memory (read only memory (ROM)), and the like. The processing section 100 performs various processes according to the present embodiment based on a program (data) stored in the information storage medium 180. Thus, the information storage medium 180 stores therein a program for causing a computer (a device including an input device, the processing section, the storage section, and an output section) to function as the sections according to the present embodiment (a program for causing a computer to perform processes of the sections).

A head mounted display (HMD) 200 is a device that is worn on the head of the user, and displays an image in front of the eyes of the user. The HMD 200 is preferably a non-transparent type, but may also be a transparent type. The HMD 200 may be what can be referred to as an eye-piece type HMD.

The HMD 200 includes a sensor section 210, a display section 220, and a processing section 240. A modification where the HMD 200 is provided with a light emitting element may be employed. The sensor section 210 implements a tracking process such as head tracking for example. For example, the position and the direction of the HMD 200 are identified through the tracking process performed with the sensor section 210. With the position and the direction of the HMD 200 thus identified, a point-of-view position and a line-of-sight direction of the user can be identified.

Various tracking schemes can be employed. For a first tracking scheme as an example of the tracking scheme, a plurality of light receiving elements (such as photodiodes) are provided as the sensor section 210, as will be described in detail later with reference to FIG. 2A and FIG. 2B. With the plurality of light receiving elements receiving light (such as a laser beam) from a light emitting element (such as a light emitting diode (LED)) provided outside, a position and a direction of the HMD 200 (the head of the user) in a three-dimensional space of the real world are identified. For a second tracking scheme, the HMD 200 is provided with a plurality of light emitting elements (LEDs) as will be described in detail later with reference to FIG. 3A and FIG. 3B. The position and the direction of the HMD 200 are identified with an external image capturing section capturing an image with light from the plurality of light emitting elements. A third tracking scheme uses a motion sensor, provided to the sensor section 210, to identify the position and the direction of the HMD 200. For example, the motion sensor can be implemented with an acceleration sensor, a gyro sensor, or the like. For example, the position and the direction of the HMD 200 in the three-dimensional space in the real world can be identified with a 6-axis motion sensor including a 3-axis acceleration sensor and a 3-axis gyro sensor. The position and the direction of the HMD 200 may be identified with a combination of the first tracking scheme and the second tracking scheme, or a combination of the first tracking scheme and the third tracking scheme. A tracking process of directly identifying the point-of-view position and line-of-sight direction of the user, instead of identifying the position and the direction of the HMD 200 to identify the point-of-view position and line-of-sight direction of the user, may be employed.

For example, the display section 220 of the HMD 200 can be implemented with a liquid crystal display (LCD), an organic electroluminescence (EL) display, or the like. For example, the display section 220 of the HMD 200 is provided as a first display set to be in front of the left eye of the user, and a second display set to be in front of the right eye of the user, whereby stereoscopic view can be implemented for example. The stereoscopic view is implemented with left-eye and right-eye images, with parallax, generated to be respectively displayed on the first and the second displays. Alternatively, the left-eye image and the right-eye image may be respectively displayed on the first and the second display areas of a single display.

The processing section 240 of the HMD 200 performs various processes required in the HMD 200. For example, the processing section 240 performs a control process for the sensor section 210, a display control process for the display section 220, or the like. The processing section 240 may perform a three-dimensional acoustic (stereophonic) process to simulate direction, distance and spreading of sound in three dimensions.

A sound output section 192 outputs sound generated in accordance with the present embodiment, and can be implemented by a speaker, a headphone, or the like.

An interface (I/F) section 194 performs an interface process for a portable information storage medium 195. The function of the I/F section 194 can be implemented with an application specific integrated circuit (ASIC) for the I/F process. The portable information storage medium 195 is a storage device that stores therein various types of information from the user, and holds the information without power supply. The portable information storage medium 195 can be implemented with an integrated circuit (IC) card (memory card), a universal serial bus (USB) memory, a magnetic card, or the like.

The communication section 196 communicates with external apparatuses (other devices) through a wired or wireless network. The function of the communication section 196 can be implemented with a communication ASIC, hardware such as a communication processor, or a communication firmware.

The program (data) for causing a computer to function as the sections according to the present embodiment may be distributed to the information storage medium 180 (or the storage section 170) from an information storage medium of a server (host device) through a network and the communication section 196. The scope of the present disclosure can include such a configuration where the information storage medium of the server (host device) is used.

The processing section 100 (processor) performs a game process (simulation process), a moving body process, a virtual camera control process, a display process, or sound process based on operation information from the operation section 160, tracking information about the HMD 200 (information about at least one of the position and direction of the HMD, information about at least one of the point-of-view position and the line-of-sight direction), a program, and the like.

Processes (functions) according to the present embodiment performed by sections of the processing section 100 can be implemented by a processor (processor including hardware). For example, the processes according to the present embodiment can be implemented by a processor that operates based on information such as a program and a memory that stores therein the information such as the program. For example, the processor may implement the functions of the sections in discrete hardware or in integrated hardware. For example, the processor may include hardware, and the hardware may include at least one of a circuit that processes a digital signal and a circuit that processes an analog signal. For example, the processor may include one or a plurality of circuit devices (such as an integrated circuit (IC) for example) or one or a plurality of circuit elements (such as a resistor and a capacitor for example) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an ASIC. The processor may include an amplifier circuit, a filter circuit, or the like that processes an analog signal. The memory (storage section 170) may be a semiconductor memory such as a static random access memory (SRAM) and a DRAM or may be a resistor. Furthermore, the memory may be a magnetic storage device such as a hard disk device (HDD) or may be an optical storage device such as an optical disc device. For example, the memory stores therein a computer-readable command, and the processes (functions) of the sections of the processing section 100 are implemented with the processor executing the command. This command may be a set of commands forming a program, or may be a command for instructing an operation to a hardware circuit of the processor.

The processing section 100 includes an input processing section 102, a calculation processing section 110, and an output processing section 140. The calculation processing section 110 includes a game processing section 112, a movable casing processing section 113, a moving body processing section 114, an object space setting section 116, a virtual camera control section 118, a display processing section 120, and a sound processing section 130. As described above, the processes according to the present embodiment performed by these sections may be implemented by a processor (or a processor and a memory). Various modifications may be made with some of these components (sections) omitted, or another component added.

The input processing section 102 performs an input process including: a process of receiving operation information or tracking information; a process of reading information from the storage section 170; and a process of receiving information through the communication section 196. For example, the input processing section 102 performs an input process including: a process of acquiring operation information input by a user by using the operation section 160 and tracking information detected by the sensor section 210 of the HMD 200; a process of reading information, designated with a read command, from the storage section 170; and a process of receiving information from an external apparatus (such as a server) through a network. The receiving process includes a process of instructing the communication section 196 to receive information, acquiring the information received by the communication section 196, and writing the information to the storage section 170.

For example, the calculation processing section 110 performs various calculation processes For example, the calculation processes are performed for a game process (simulation process), a moving body process, a virtual camera control process, a display process, a sound process, or the like.

The game processing section 112 (a program module for a game process) performs various game processes for the user to play the game. In other words, the game processing section 112 (simulation processing section) performs various simulation processes to enable the user to experience virtual reality. Examples of the game process include a process of starting the game when a game start condition is satisfied, a process of making the started game progress, a process of ending the game when a game end condition is satisfied, and a process of calculating a game result.

The movable casing processing section 113 (a program module for a movable casing process) performs various processes for the movable casing 40 including, for example, a control process for the movable casing 40 and a detection process for various types of information for controlling the movable casing 40. The movable casing processing section 113 performs a control process on electric cylinders 413 and 414 in FIG. 7A described later for example. For example, a process of controlling a linear motion of a rod sections of the electric cylinders 413 and 414 is performed. The movable casing processing section 113 performs a process of detecting information about operation using operation levers 161 and 162, an accelerator pedal 163, and a brake pedal 164 illustrated in FIG. 4. Then, the control process or the like for the movable casing 40 is performed based on the operation information detected. The movable casing processing section 113 performs a control process for air spring sections 50 to 53 illustrated in FIG. 8 described later. For example, a control process for extending/contracting the air spring sections 50 to 53 is performed. When a swing operation is performed with the operation members 43 and 44, or an edging operation is performed with the foot pedals 45 and 46, the movable casing processing section 113 performs a detection process for the resultant operation information, and performs the control process for the movable casing 40 and the like based on the operation information thus detected.

The moving body processing section 114 (a program module for a moving body process) performs various processes for a moving body that moves in a virtual space. For example, a process of moving the moving body in an object space (game space) that is a virtual space or a process of causing the moving body to make an action is performed. For example, the moving body processing section 114 performs a control process based on the operation information input by the user using the operation section 160, tracking information acquired, a program (movement/operation algorithm), and various types of data (motion data), and the like. The control process includes moving the moving body (model object) in the object space (virtual space) and causing the moving body to make an action (motion, animation). Specifically, a simulation process is performed to sequentially obtain movement information (position, rotational angle, speed, or acceleration) and action information (a position and a rotational angle of a part object) of the moving body on a frame (for example, 1/60 seconds) by frame basis. The frame is a unit of time for performing a movement/action process (simulation process) of the moving body and an image generation process.

For example, the moving body is a virtual user (virtual player) in a virtual space corresponding to the user (player) in the real space or a ridden moving body (operated moving body) ridden (operated) by the virtual user. For example, the moving body is a robot (ridden moving body) that is ridden by a character (virtual user) corresponding to the user in a case of a robot simulator in FIG. 4 described later, or is a character (virtual user) corresponding to the user that skies in the virtual space in a case of a ski simulator in FIG. 8.

The object space setting section 116 (a program module for an object space setting process) performs a setting process for an object space (a virtual space in a broad sense) in which a plurality of objects are arranged. For example, a process of setting an arrangement of various objects (an object formed by a primitive surface such as a polygon, a free-form surface or a subdivision surface) representing various display objects such as a moving body (such as a person, a robot, a car, a train, an aircraft, a boat, a monster, or an animal), a map (terrain), a building, audience seats, a course (road), woods, a wall, and a water surface in the object space is performed. Specifically, a position and a rotational angle (that is the same as an orientation or a direction) of an object in a world coordinate system are determined, and the object is arranged at the position (X, Y, Z) at the rotational angle (rotational angles about X, Y, and Z axes). Thus, the object information storage section 172 of the storage section 170 stores object information in association with an object number. The object information includes information about a position, rotational angle, a moving speed, a moving direction, and the like of an object (part object) in the virtual space. The object space setting section 116 performs a process of updating this object information on a frame by frame basis for example.

The virtual camera control section 118 (a program module for a virtual camera control process) performs a control process for a virtual camera (point-of-view, reference virtual camera) to generate an image as viewed from a given (any) point-of-view in the object space. For example, a process of controlling a position (point-of-view position) or an orientation (line-of-sight direction) of the virtual camera is performed. Specifically, a process (a process of controlling a point-of-view position, a line-of-sight direction, or an angle of view) of controlling the position (X, Y, Z) of the virtual camera and a rotational angle (a rotational angle about an X, Y, or Z axis) as orientation information is performed. The virtual camera corresponds to a point-of-view of the user (virtual user). When stereoscopic view is implemented, a left-eye first point-of-view (left-eye first virtual camera) and a right-eye second point-of-view (right-eye second virtual camera) are set.

The display processing section 120 (a program module for a display process) performs a display process for a game image (simulation image). For example, a rendering process is performed based on results of various processes (a game process, a simulation process) performed by the processing section 100 to generate an image, and the image is displayed on the display section 220 of the HMD 200. Specifically, a geometry process such as coordinate transformation (world coordinate transformation, camera coordinate transformation), a clipping process, a perspective transformation, or a light source process is performed. Rendering data (coordinates of the vertex position of the primitive surface, texture coordinates, color data, a normal vector, an a value, or the like) is generated based on a result of the process. An object (one or a plurality of primitive surfaces) after the perspective transformation (after the geometry process) is rendered in the rendering buffer 178 (a frame buffer, a work buffer or the like that can store image information in a unit of pixels), based on the rendering data (primitive surface data). Thus, an image in the object space (virtual space) as viewed from the virtual camera (a given point-of-view, a left-eye, right-eye, first, or second point-of-view) is generated. The rendering process performed by the display processing section 120 can be implemented with a vertex shader process, a pixel shader process, or the like.

The sound processing section 130 (a program module for sound process) performs a sound process based on a result of various processes performed by the processing section 100. Specifically, game sound such as a song (music, background music (BGM)), a sound effect, or a voice is generated to be output by the sound output section 192. A part (three-dimensional acoustic process for example) of the sound process performed by the sound processing section 130 may be implemented by the processing section 240 of the HMD 200.

The output processing section 140 performs an output process of outputting various types of information. For example, the output processing section 140 performs the output process including: a process of writing information to the storage section 170; and a process of transmitting information through the communication section 196. For example, the output processing section 140 performs a process of writing information, designated by a write command, to the storage section 170, and a process of transmitting information to an external apparatus (such as a server) through a network. This transmission process is a process of instructing the communication section 196 to transmit information, and a process of designating the information to be transmitted to the communication section 196.

The simulation system according to the present embodiment includes the moving body processing section 114, the virtual camera control section 118, and the display processing section 120, as illustrated in FIG. 1. Furthermore, the input processing section 102 may be included.

The moving body processing section 114 performs a process of moving the moving body (such as a virtual user or a ridden moving body) corresponding to the user, in the virtual space (object space). For example, the moving body processing section 114 performs a process of moving the moving body on a course and the like in the virtual space, by performing a process of obtaining information about the position and the direction of the moving body once in every predetermined period of time (in each frame for example). Furthermore, the moving body processing section 114 performs a process (motion process) of causing the moving body to make an action and the like.

The virtual camera control section 118 controls a virtual camera moving in accordance with the movement of the moving body. For example, the virtual camera that moves to follow the moving body is controlled. For example, the virtual camera control section 118 controls the virtual camera set as a first person point-of-view of the user. For example, the virtual camera is set to be at a position corresponding to the point-of-view of a moving body moving in the virtual space, and the point-of-view position and the line-of-sight direction of the virtual camera are set to control the position (position coordinates) and the orientation (a rotational angle about a rotation axis) of the virtual camera.

The display processing section 120 generates an image as viewed from the virtual camera (user point-of-view) in the virtual space as a display image (display video) of the HMD 200. For example, an image as viewed from a given point-of-view in the object space as the virtual space is generated. The image generated is preferably a stereoscopic image.

The display processing section 120 performs an image effect process for motion sickness prevention (3D sickness prevention). Specifically, the display processing section 120 generates a display image by performing the image effect process for motion sickness prevention (an image process in a broad sense) as a process of blurring, compared with a display object in a given distance range from the virtual camera, an image of a display object in a distance range farther than the given distance range. For example, the blurring process is not performed on a display object (object) in a first distance range that is the given distance range, and is performed on a display object in a second distance range that is the distance range farther than the given distance range. As a result, an in-focus image (focus image) is obtained for the display object in the first distance range, and an out-of-focus image (defocused image) is obtained for the display object in the second distance range. The first distance range and the second distance range need not to be continuous, and thus a third distance range may be provided therebetween. The distance range is a range of distance (depth distance) measured in a depth direction (Z direction) from the virtual camera. The image effect process may be performed as a post effect process on an image as viewed from the virtual camera (an image generated by the rendering process) for example. The image effect process for motion sickness prevention is not an effect process for generating a photorealistic image, and is an effect process performed for preventing the user from feeling 3D sickness.

For example, the display processing section 120 performs a depth of field process as the image effect process. The depth of field process is a process of applying a blurring process (blur) to a scene in accordance with the distance about the plane of focus. The depth of field process is prepared as a library of image process engines (for example, Unreal Engine) for example. For example, in the depth of field process, various parameters such as a blurring scheme (such as Gaussian DOF, or blur DOF), a focus distance, an in-focus range, a near side transition range (near transition range), a far side transition range (far transition range), or a blurring level (blur size) can be set. In the present embodiment, such a parameter is set with a special setting for motion sickness prevention, different from normal setting for generating a photorealistic image.

Specifically, the display processing section 120 performs a depth of field process in which the given distance range (first distance range) is included in the in-focus range of the depth of field, and the blurring process is not performed in a region (near region) more on a near side than the in-focus range as viewed from the virtual camera and is performed in a region (far region) more on a far side than the in-focus range. Thus, the depth of field process for motion sickness prevention is performed with the parameter described above set for implementing the depth of field process as described above. For example, the parameter of the depth of field process is set so that the near transition range is set to be excluded from the target and the in-focus range is set to be a range between the position of the virtual camera and the far transition range. The given distance range (for example, a distance range between 0.75 m and 3.5 m described later) is set to be included in the in-focus range.

In such a case, the display processing section 120 may change the width of the in-focus range of the depth of field in accordance with the movement status (such as speed, acceleration, or movement direction) of the moving body. For example, the in-focus range is reduced as the speed (angular speed) of the moving body increases. For example, the in-focus range is set to have a normal width while the moving body is in a stopped state, and is narrowed when the moving body reaches or exceeds a given speed (angular speed). The in-focus range may be further narrowed thereafter as the speed increases.

The display processing section 120 may perform a fog process as the image effect process. The fog process may be a fog process where a fog color (a target color of fog) can be set (for example, Exponential Height Fog in an Unreal Engine), or may be a fog process where the fog color is not set (for example, Environment Fog in the Unreal Engine). The depth of field process and the fog process are preferably both performed as the image effect process. For example, a fog process with a fog color (such as black, white, or red) corresponding to each game stage (such as a night, morning, or evening game stage) is performed while the depth of field process is also performed. Thus, more effective motion sickness prevention can be achieved.

The display processing section 120 may performs an image effect process in which a blurring process is not performed on a display object determined to be intersecting with a line segment with a given length extending in the line-of-sight direction from the virtual camera in a process of determining whether collision with the line segment has occurred, and is performed on other display objects. For example, a range for generating an image of a display object without the blurring process is defined by the length of the line segment. Under this condition, whether or not a display object is intersecting with the line segment extending from the virtual camera is determined. The blurring process is not performed on the display object determined to be intersecting with (collide with) the line segment. Thus, an in-focus image is generated for such a display object. The other display objects that are not intersecting with the line segment are treated as target candidates of the blurring process, and the blurring process is performed on such display objects. The line segment may be a line segment for setting cross hairs on an enemy for example. For example, the target object intersecting with the line segment is the attacking target of the user, and when the user makes an attacking action in a state where the cross hairs are displayed to overlap with the display object, the display object is successfully attacked.

The given distance range is a range set based on a virtual visual distance (a visual distance in broad sense) of the HMD 200 for example. For example, if the HMD 200 has an optical system such as an eyepiece and a display, the virtual visual distance is defined based on positional relationship among the position of the user's eyes, the eyepiece, and the display. A virtual screen positioned at the virtual visual distance is a screen of the HMD 200 displaying an image (virtual image). For example, the optical system of the HMD 200 is designed to provide vision that is equivalent to viewing the screen at a point separated from the screen by this virtual visual distance. The blurring process will not be performed on a display object within the given distance range including this virtual visual distance, so that an in-focus image is generated for the display object.

Specifically, the given distance range is a range of distance between 0.75 m and 3.5 m from the virtual camera for example. The distance is a distance in the virtual space, and the virtual world is designed so that the distance in the virtual space matches (substantially matches) the distance in the real world. For example, it has been confirmed that generally, the user can watch the display object within the distance range between 0.75 m and 3.5 m for a long period of time, without feeling eye tiredness or the like. Thus, the display processing section 120 does not perform the blurring process on the display object in a range at least between 0.75 m and 3.5 m that is the given distance range, and performs the blurring process on a display object in a distance range farther than the given distance range.

The display processing section 120 skips the blurring process on a predetermined display object in the distance range (second distance range) farther than the given distance range (first distance range), or performs the blurring process on the predetermined display object with a blurring level lower than a blurring level of the blurring process on other display objects in the distance range. For example, for a display object important in the game or a specific display object that needs to be seen by the user, the blurring process as the image effect process is skipped or is performed with a blurring level (effect level) lower than those for other blurring target display objects. Thus, the display object important for the user and the like can be prevented from being heavily blurred by the image effect process to be difficult to visually recognize by the user.

The display processing section 120 performs a process of enhancing the visibility of a predetermined display object in a distance range farther than the given distance range, to be higher than visibility of the other display objects. For example, the display processing section 120 performs, as the process of enhancing visibility, at least one of a size change process, a luminance change process, a color tone change process, and a depth value change process on the predetermined display object. The process of enhancing the visibility is a process for enabling the user to more easily visually recognize the target display object. The size change process is a process of changing the size of the display object. The luminance change process and the color tone change process are respectively processes of changing the luminance (brightness) and the color tone (tone, a category of color defined by a combination of lightness and saturation) of the display object. The depth value change process is a process of changing a depth value (a distance in the depth direction as viewed from the virtual camera) of the display object.

The input processing section 102 (input reception section) acquires tracking information for point-of-view information about the user wearing the HMD 200. For example, the input processing section 102 acquires tracking information (point-of-view tracking information) for point-of-view information that is at least one of the point-of-view position and the line-of-sight direction of the user. For example, the tracking information can be acquired by performing a tracking process for the HMD 200. The point-of-view position and the line-of-sight direction of the user may be directly acquired by the tracking process. The tracking information includes change information indicating a change of the point-of-view information from initial point-of-view information of the user. For example, the tracking information includes at least one of: change information (a value indicating a change in coordinates of the point-of-view position) indicating a change of the point-of-view position from the initial point-of-view position of the user; and change information (a value indicating a change in the rotational angle of the line-of-sight direction about the rotation axis) indicating a change of the line-of-sight direction from the initial line-of-sight direction of the user. Based on the change information about the point-of-view information included in such tracking information, the point-of-view position and/or the lineof-sight direction of the user (the information about the position and the orientation of the head of the user) can be identified.

The virtual camera control section 118 changes the position and/or the orientation of the virtual camera based on the tracking information (information about at least one of the point-of-view position and the line-of-sight direction of the user). For example, the virtual camera control section 118 sets the virtual camera so that the position (point-of-view position) and the orientation (line-of-sight direction) of the virtual camera changes in accordance with the change in the point-of-view position and the line-of-sight direction of the user in the real space.

For example, the virtual camera is set for the point-of-view (first person point-of-view) of the virtual user in the virtual space. When the point-of-view position and the line-of-sight direction of the user changes as a result of the user in the real space (real world) wearing the HMD 200 shaking his or her head or moving his or her body, the point-of-view position and the line-of-sight direction of the virtual user in the virtual space change accordingly. Thus, when the point-of-view position and the line-of-sight direction of the user in the real space change, the position and the orientation of the virtual camera in the virtual space change accordingly. When the virtual user (character) or its ridden moving body (such as a robot, a train, a car, a motor cycle, a bicycle, an aircraft, or a ship) moves in the virtual space by the user operating the operation section 160, the position (the point-of-view position of the virtual user) of the virtual camera also changes to follow the movement. Thus, the user can experience virtual reality as if the virtual user as his or her avatar, or its ridden moving body is moving in the virtual space. The point-of-view of the virtual user in the virtual space is the first person point-of-view. An image as viewed from the first person point-of-view may include a body part of the virtual user (character) and what is going on inside the ridden moving body.

The orientation of the virtual camera can be defined by a vector of the line-of-sight direction of the virtual camera and a vector of an upward direction of the virtual camera (a vector indicating which direction is the upward direction of the virtual camera). The vector of the line-of-sight direction can be set based on a gaze position of the virtual camera. For example, orientation change (rotational movement) corresponding to pitching and/or yawing of the virtual camera can be implemented by changing the vector of the line-of-sight direction of the virtual camera. For example, the orientation change (rotational movement) corresponding to rolling of the virtual camera can be implemented by changing the vector of the upward direction of the virtual camera.

The orientation of the moving body can be defined by a rotational angle of the moving body (model object) about each of a plurality of rotation axes (X axis, Y axis, and Z axis). The orientation change of the moving body corresponds to rotational movement about each rotation axis. For example, the orientation of the moving body can be defined by the rotational angle of the moving body about each rotation axis of the local coordinate system with respect to the world coordinate system, and can be represented by a rotation matrix for the coordinate conversion for example.

The image may be projected by a projection device on a projection screen, instead of being displayed on the HMD 200. The projection screen is a screen including a single curved surface or a plurality of surfaces, and is a curved screen that is known as a dome shaped screen for example.

The display processing section 120 sets the image effect process to be ON or OFF or sets the effect level of the image effect process, based on a status on a change in the line-of-sight direction or point-of-view position of the virtual camera, a status on a change in the movement status of the moving body, a status on a gaze location or a gaze target of the virtual camera, or a game status.

For example, the image effect process is turned ON when an event (change event) that largely changes the line-of-sight direction or point-of-view position of the virtual camera or the speed or acceleration (movement status in a broad sense) of the moving body occurs. For example, in an event (such as collision, sharp turn, spin, overturning, steep downhill, or fall) where the line-of-sight direction or point-of-view position of the virtual camera or the speed or acceleration of the moving body sharply changes or is expected to change, it is determined that the user is likely to feel 3D sickness, and thus the image effect process is turned ON. On the other hand, the image effect process may be turned OFF if the line-of-sight direction or point-of-view position of the virtual camera, the speed or acceleration of the moving body, or the like did not change at all. Alternatively, the effect level of the image effect process is set in accordance with a change amount of the line-of-sight direction or point-of-view position of the virtual camera, the speed or acceleration of the moving body, or the like. For example, a higher effect level is set for a larger change amount. An example of the effect level is information indicating the blurring level in the blurring process, a start timing of the effect process, and the length of the effect process.

Alternatively, the image effect process is turned ON when the gaze location or the gaze target of the virtual camera is a location or a target that is likely to cause motion sickness, and is otherwise turned OFF. For example, the image effect process is turned ON when a scene in a direction of the virtual camera corresponding to the point-of-view of the user is in a state that is likely to cause 3D sickness. For example, the image effect process is turned ON in a state where many display objects are displayed at a gaze location or the like, and is turned OFF in a state where almost no display object is displayed thereat. Alternatively, the effect level of the image effect process is changed in accordance with the status of the gaze location or gaze target. For example, the effect level of the image effect process is changed in accordance with the number of display object at the gaze location or the like. For example, the effect level is set to be higher for a larger number of display objects. Alternatively, the image effect process is turned ON if the game status is likely to cause the sickness and is otherwise turned OFF. Alternatively, the effect level of the image effect process is changed in accordance with the game status. For example, the game status is a game progress status (such as an early, middle, or final stage of the game), a status of a game stage played by the user (such as a type or an attribute of the game stage), a status of a battery with an enemy, a status on the user (virtual user) or his or her acquired points, a status of the surrounding of the user (virtual user) in the game, or the like.

Table information in which the motion sickness level is set for each scene may be stored in advance in the storage section 170, and the image effect process may be set to be ON or OFF or the effect level of the image effect process may be set based on this table information.

The display processing section 120 may set the image effect process to be ON or OFF or set the effect level of the image effect process based on a play level (gameplay level) of the user. For example, the image effect process is set to be ON for a user with a low play level (such as a beginner or an elementary level player for example), and is turned OFF for a user with a high play level (such as a skilled player for example). Alternatively, the effect level of the image effect process is set to be higher for a lower play level of the user, to prevent a beginner or an elementary level user who is not used to playing the game from feeling 3D sickness. On the other hand, the effect level of the image effect process is set to be lower for a higher play level of the user, so that the skilled user can enjoy the game with a game image that is not heavily affected by the image effect process.

In such a case, the play level of the user can be determined based on tracking information obtained by tracking the movement of the head of the user or the play history information about the user. For example, a process of determining the play level of the user is performed based on the tracking information (point-of-view tracking information) about the head of the user after the game has started, the user's past play history information stored in the storage section 170, and the like. This determination process is performed by the game processing section 112 for example. For example, a beginner or an elementary level user tends not to move his or her head, on which the HMD 200 is mounted, for a while after the game has started. On the other hand, a skilled user tends to move his or her head frequently to see various locations at the early stage of the game. In this context, the play level of the user can be determined based on the tracking information about the movement of the head of the user after the game has started. Alternatively, the play level of the user is determined based on the past play history information about the user. For example, a user who is determined to have played the game frequently based on the play history information is determined to have a high play level, and a user determined to be playing the game for the first time based on the play history information is determined to have a low play level. The play history information may be read from the portable information storage medium 195 held by the user, or may be downloaded from a server based on identification information such as a user ID stored in the portable information storage medium 195.

The display processing section 120 may set the image effect process to be ON or OFF or set the effect level of the image effect process based on the information set by the user or the play history information about the user. For example, the image effect process is enabled to be ON or OFF or the effect level of the image effect process is enabled to be set on an option setting screen for the user to input various types of setting information for the game. Alternatively, the image effect process is set to be ON or OFF or the effect level of the image effect process is set based on the past play history information about the user or the like. For example, the image effect process is set to be OFF or the effect level of the image effect process is set to be low for the user that is determined to have played the game frequently and thus is determined to be familiar with the gameplay or a skilled player, based on the play history information. On the other hand, the image effect process is set to be ON or the effect level of the image effect process is set to be high for the user determined to be a beginner or an elementary level user or an intermediate level player, based on the play history information.

In the present embodiment, a virtual reality simulation process is performed as a game process for the game played by the user. The virtual reality simulation process is a simulation process simulating a real space event in the virtual space, and is for enabling the user to virtually experience the event. For example, a process of moving the moving body such as a virtual user corresponding to the user in the real space or its ridden moving body in the virtual space is performed for enabling the user to experience a change in an environment or surroundings due to the movement.

The movable casing 40 changes the play position of the user based on the movement status of the moving body. The movement status includes the speed (angular velocity), acceleration (angular acceleration), and the movement direction of the moving body, as well as an environment of the movement. The movable casing 40 changes the play position based on a result of the simulation process as a game process. For example, the play position is changed based on a result of the process of moving the moving body in the virtual space or the like. For example, the movable casing 40 performs a process of changing the play position as a simulation process for enabling the user to feel the change (accelerated or decelerated) in acceleration due to the change in the traveling direction of the user. Alternatively, when the moving body moves on the course, the movable casing 40 performs a process of changing the play position as a simulation process for enabling the user to feel the ups and downs or bumpiness of the course. With the play position thus changed by the movable casing 40, movement of the display image on the HMD 200 is somewhat linked with the change in acceleration and the like felt by the user, whereby the 3D sickness and the like felt by the user can be suppressed.

The play position is a position of the user playing a virtual reality (VR) simulation game. For example, the play position is a ride position of the user on a ride section such as a seat. For example, when a virtual reality simulation game is played with the player seated on a seat serving as the ride section, the play position is a seated position which corresponds to the ride position for the seat for example. When the user is saddled on a ride section simulating a ride such as a motor cycle or a bicycle or an animal such as horse, the play position is the saddled position. In a simulation game played by the user in a standing posture, the play position is the standing position of the user for example.

The simulation system according to the present embodiment includes the sound processing section 130 that performs a process of generating output sound based on the movement status of the moving body. For example, sound corresponding to a change in the traveling direction of the moving body and output sound corresponding to the status of the course on which the moving body moves are generated. For example, when the traveling direction of the moving body changes or the status of the course changes, the output sound for making a user recognize the change is generated. For example, for a bumpy course, a "rattling" sound is output so that the user can aurally recognize that the course is bumpy. When the traveling direction of the user suddenly changes, sound that makes the user recognize the change (accelerated or decelerated) in the acceleration involved in the change in the traveling direction is output, so that the user can aurally recognize the change in the traveling direction. Thus, a risk of making the user feel 3D sickness can be reduced.

2. Tracking Process

Figure 2A:
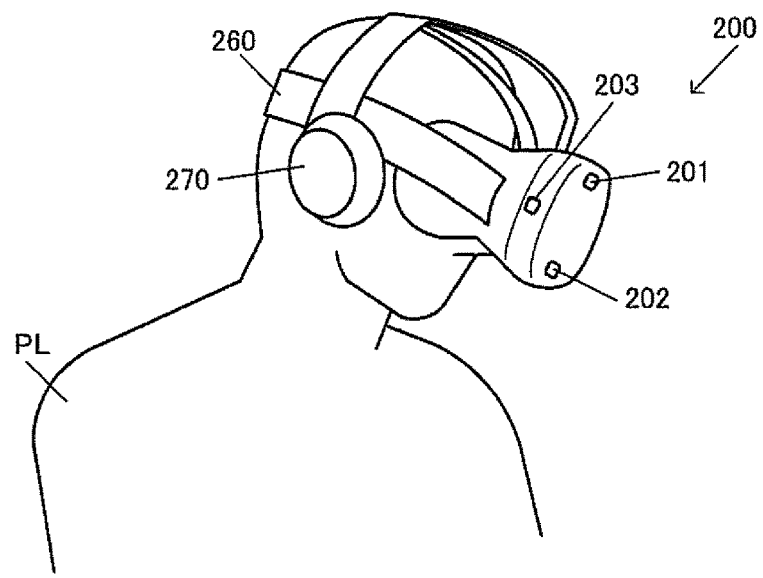
FIG. 2A and FIG. 2B illustrate an example of an HMD used in the present embodiment.

Next, an example of a tracking process will be described. FIG. 2A illustrates an example of the HMD 200 used in the simulation system in the present embodiment. As illustrated in FIG. 2A, the HMD 200 is provided with a plurality of light receiving elements (photodiodes) 201, 202, and 203. The light receiving elements 201 and 202 are provided on the front surface side of the HMD 200, whereas the light receiving element 203 is provided on the right side surface of the HMD 200. Note that unillustrated light receiving elements are further provided on the left side surface, the upper surface, or the like of the HMD.

The HMD 200 is provided with a headband 260 and the like so that a user PL can stably wear the HMD 200 on his or her head with a better fitting comfort. The HMD 200 is provided with an unillustrated headphone terminal. The user PL can hear game sound as a result of a three-dimensional acoustic (three-dimensional audio) process for example, with a headphone 270 (sound output section 192) connected to the headphone terminal. The user may be enabled to input operation information through a head nodding or shaking action to be detected by the sensor section 210 of the HMD 200 and the like.

Figure 2B:
Figure 2B:
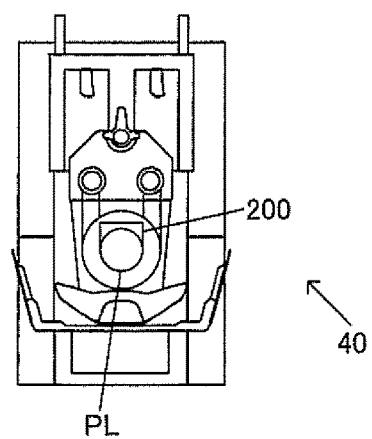

As illustrated in FIG. 2B, base stations 280 and 284 are installed in the periphery of the simulation system (movable casing 40). The base station 280 is provided with light emitting elements 281 and 282, and the base station 284 is provided with light emitting elements 285 and 286. For example, the light emitting elements 281, 282, 285, and 286 are implemented with LEDs that emit laser beams (such as infrared laser beams). The base stations 280 and 284 radially emit laser beams by using the light emitting elements 281, 282, 285, and 286, for example. With the light receiving elements 201 to 203 provided to the HMD 200 in FIG. 2A and the like receiving the laser beams from the base stations 280 and 284, the tracking of the HMD 200 is implemented so that the position and the facing direction of the head of the user PL (point-of-view position, line-of-sight direction) can be detected.

Figure 3A:
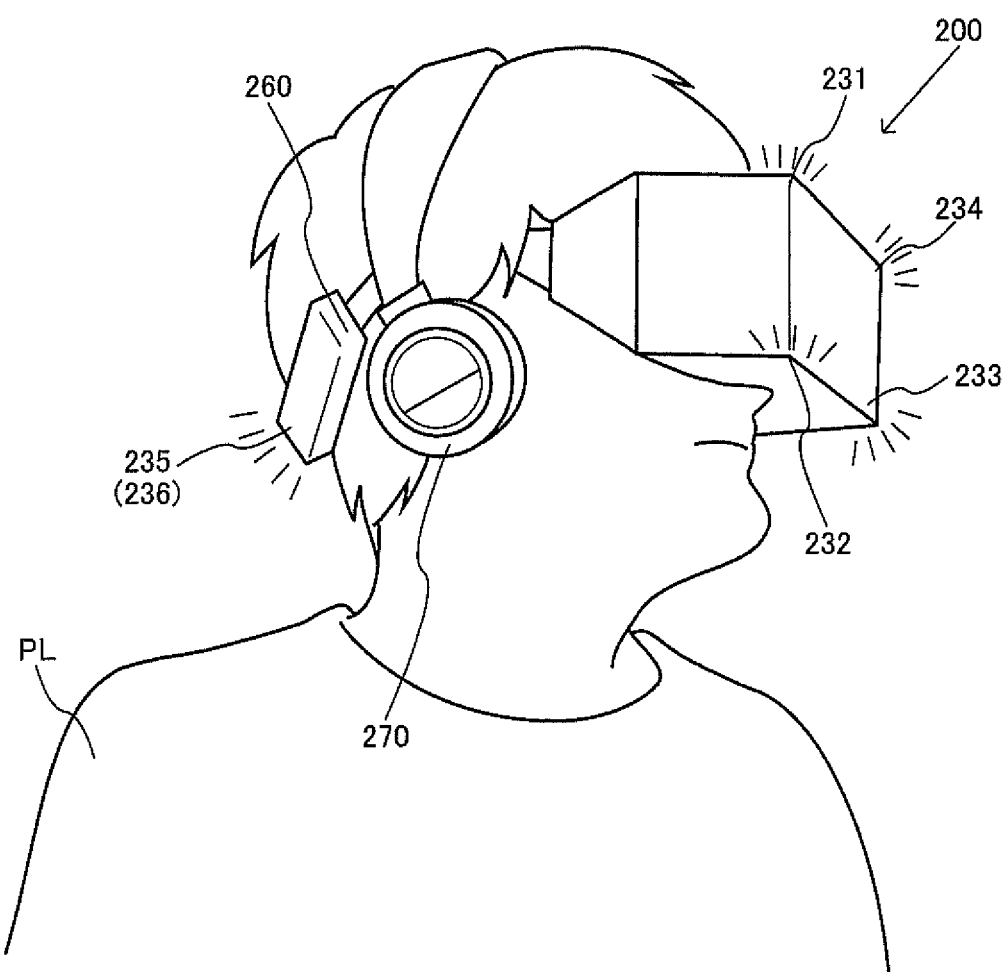
FIG. 3A and FIG. 3B illustrate another example of the HMD used in the present embodiment.
Figure 3B:
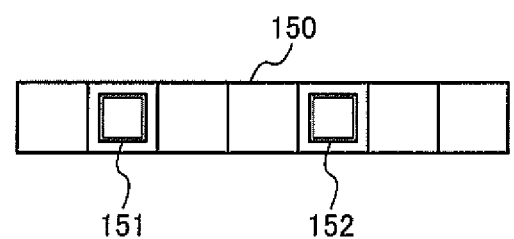

FIG. 3A illustrates another example of the HMD 200. The HMD 200 illustrated in FIG. 3A is provided with a plurality of light emitting elements 231 to 236. For example, these light emitting elements 231 to 236 are implemented with LEDs or the like. The light emitting elements 231 to 234 are provided on the front surface side of the HMD 200, and the light emitting element 235 and the light emitting element 236 (not illustrated) are provided on the back surface side. These light emitting elements 231 to 236 emit light in a wavelength band of visible light (light emission) for example. Specifically, the light emitting elements 231 to 236 emit light of colors different from each other. An image capturing section 150 illustrated in FIG. 3B is provided on the forward side of the user PL, and captures an image of the light from the light emitting elements 231 to 236. Thus, the captured image obtained by the image capturing section 150 includes spots of the light from the light emitting elements 231 to 236. The head (HMD) of the user PL is tracked with image processing executed on the captured image. Thus, the three-dimensional position and the facing direction of the head of the user PL (the point-of-view position and the line-of-sight direction) are detected.

For example, as illustrated in FIG. 3B, the image capturing section 150 is provided with first and second cameras 151 and 152. The position of the head of the user PL in a depth direction and the like can be detected by using first and second captured images respectively captured by the first and the second cameras 151 and 152. Based on motion detection information obtained by the motion sensor provided to the HMD 200, the rotational angle (line-of-sight) of the head of the user PL can also be detected. Thus, with such an HMD 200, the display section 220 of the HMD 200 can display an image (an image as viewed from the virtual camera corresponding to the point-of-view of the user) of the virtual space (virtual three-dimensional space) corresponding to the direction in which the user PL is facing regardless of which of all 360 degrees directions he or she is facing. LEDs emitting infrared light, instead of the visible light, may be used as the light emitting elements 231 to 236. Furthermore, another method such as one using a depth camera or the like may be employed to detect the position and/or movement of the head of the user and the like.

The tracking process for detecting the point-of-view position and/or line-of-sight direction (the position and/or direction of the user) of the user is not limited to the method described with reference to FIG. 2A to FIG. 3B. For example, the tracking process may be implemented solely by the HMD 200 by using the motion sensor and the like provided to the HMD 200. Specifically, the tracking process is implemented without providing external devices such as the base stations 280 and 284 in FIG. 2B, the image capturing section 150 in FIG. 3B, and the like. Alternatively, various point-of-view tracking processes such as known eye tracking, face tracking, or head tracking can be employed to detect the point-of-view information such as the point-of-view position and the line-of-sight direction or the like of the user.

3. Specific Example of Simulation System

Figure 4:
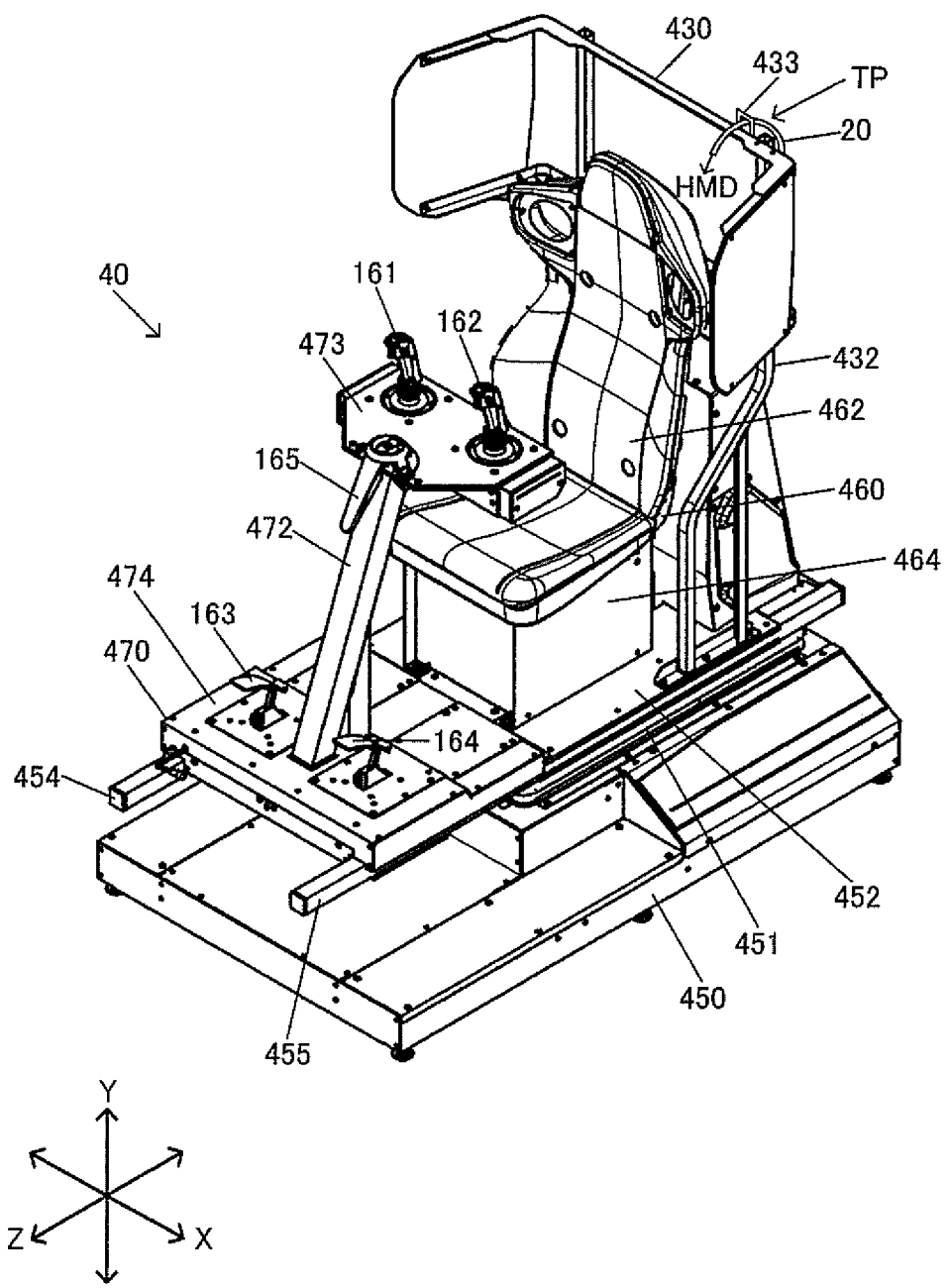
FIG. 4 illustrates a configuration example of a robot simulator that is an example of the simulation system.

Next, a specific example of the simulation system will be described. FIG. 4 is a perspective view illustrating a configuration example of a robot simulator (robot game device) as an example of the simulation system. The movable casing 40 illustrated in FIG. 4 has a cover section 451 and a base section 452 (base) provided over a bottom section 450 (base section) in this order. The base section 452 is provided with a seat support section 464. A ride section 460 is formed with a seat 462 attached on the seat support section 464.

The base section 452 is provided with a movement section 470. Specifically, the base section 452 is provided with rail sections 454 and 455, and the movement section 470 is provided to be movable in a direction along the rail sections 454 and 455.

The movement section 470 has a support section 472 with an upper end provided with an upper surface section 473 (operation board). The upper surface section 473 is provided with the operation levers 161 and 162 and a game controller 165 having a sensor section. The sensor section of the game controller 165 detects at least one of the position and the direction. The operation levers 161 and 162 are part of the operation section 160 in FIG. 1. When the user manually operates the operation levers 161 and 162, the virtual user in a cockpit of the robot in the virtual space is displayed to operate the operation levers in the cockpit accordingly.

When the user pushes down the operation levers 161 and 162 forward, the robot in the virtual space moves forward. When the user pulls down the operation levers 161 and 162 rearward, the robot in the virtual space moves rearward. When the user pushes down the operation levers 161 and 162 rightward or leftward, the robot moves rightward or leftward. By pushing down one of the operation levers 161 and 162 forward, and pulling down the other one rearward, the orientation of the robot can be changed.

The game controller 165 is provided with at least one light receiving element used as a sensor section. A detection function (a function of detecting at least one of the position and the direction) of the sensor section of the game controller 165 is implemented with a process similar to the tracking process illustrated in FIGS. 2A and 2B. With this detection function, a change in the play position (the ride position and the seated position of the ride section 460) due to the movement of the movable casing 40 can be detected for example.

The support section 472 of the movement section 470 has a lower end provided with a lower surface section 474 provided with the accelerator pedal 163 and the brake pedal 164. When the user depresses the accelerator pedal 163, the robot makes a dash movement that is an accelerated movement in the virtual space. When the user depresses the brake pedal 164, the movement of the robot stops.

The base section 452 of the movable casing 40 is provided with a frame section 430. The frame section 430 has a guide section 432 that guides the cable 20 from a processing device. For example, the cable 20 is guided through a predetermined route from the lower side to the upper side for example. The guided cable 20 is connected to the HMD 200 via a via point TP. Specifically, the cable 20 is fixed by a fixing jig 433 at the via point TP to be connected to the HMD 200.

Figure 5A:
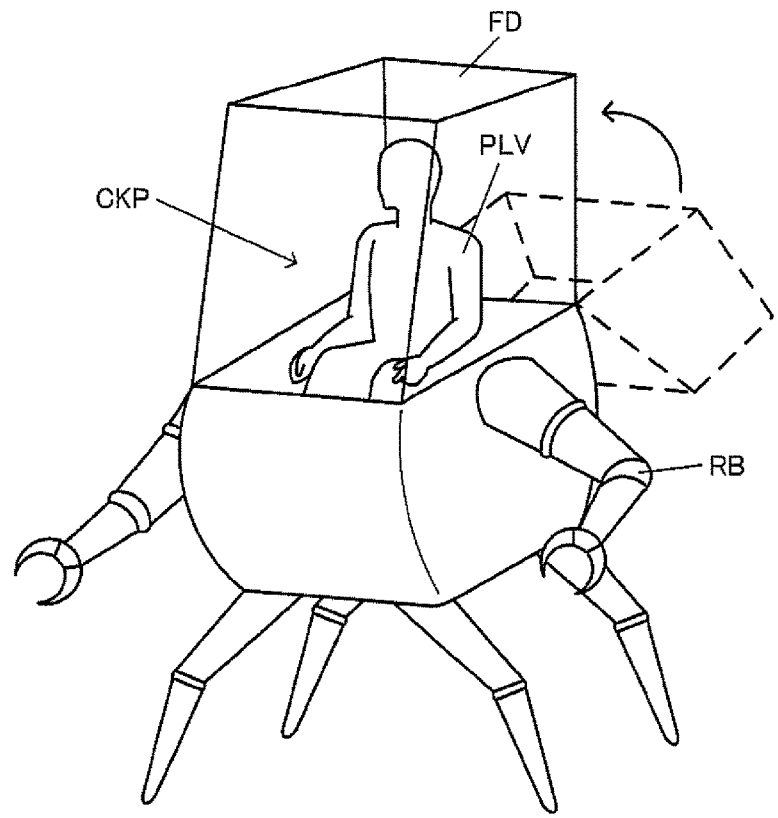
FIG. 5A illustrates a robot ridden by a virtual user in a virtual space.

In the robot simulator according to the present embodiment, as illustrated in FIG. 5A, a game image of a robot game in which a virtual user PLV (virtual player) corresponding to the user rides a cockpit CKP of a robot RB in the virtual space to battle an enemy robot and the like is generated. When the robot RB makes a sortie, a hood FD in FIG. 5A is closed in the virtual world. Then, the user (virtual user) operates the robot RB in the cockpit CKP with a limited space to enjoy the game of fighting with an enemy robot etc.

Figure 5B:
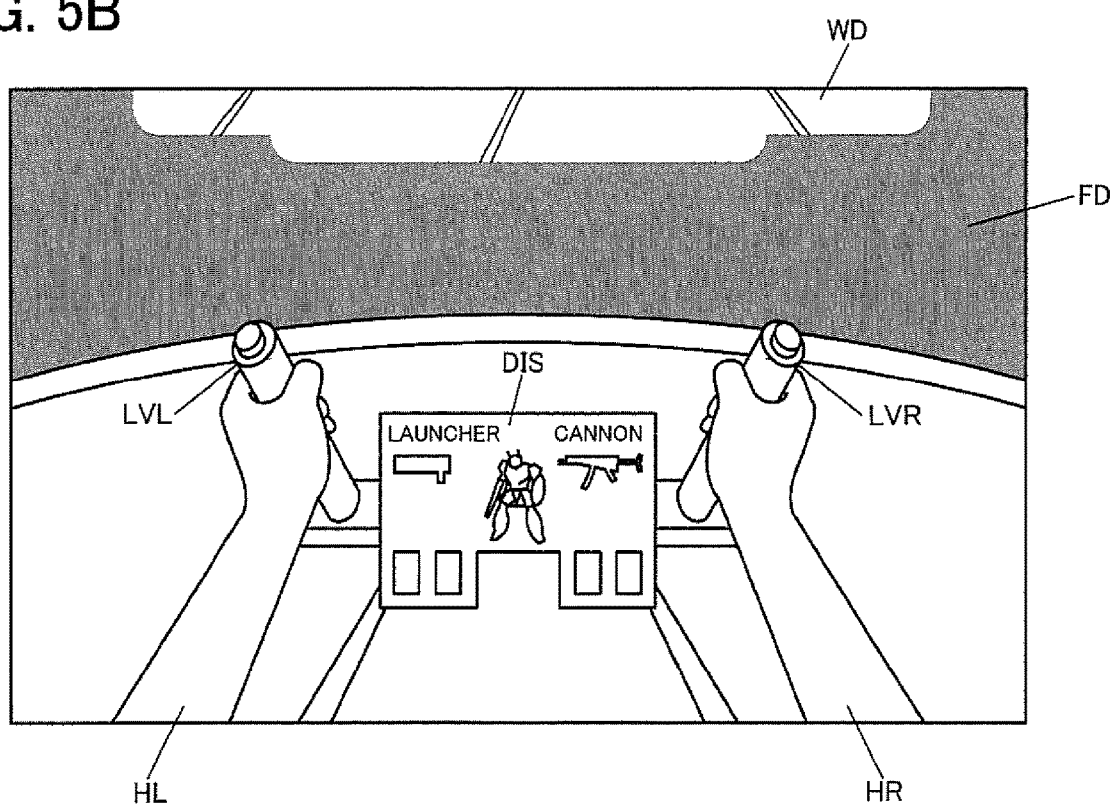
FIG. 5B illustrates an example of a game image in a robot simulator.
Figure 6:
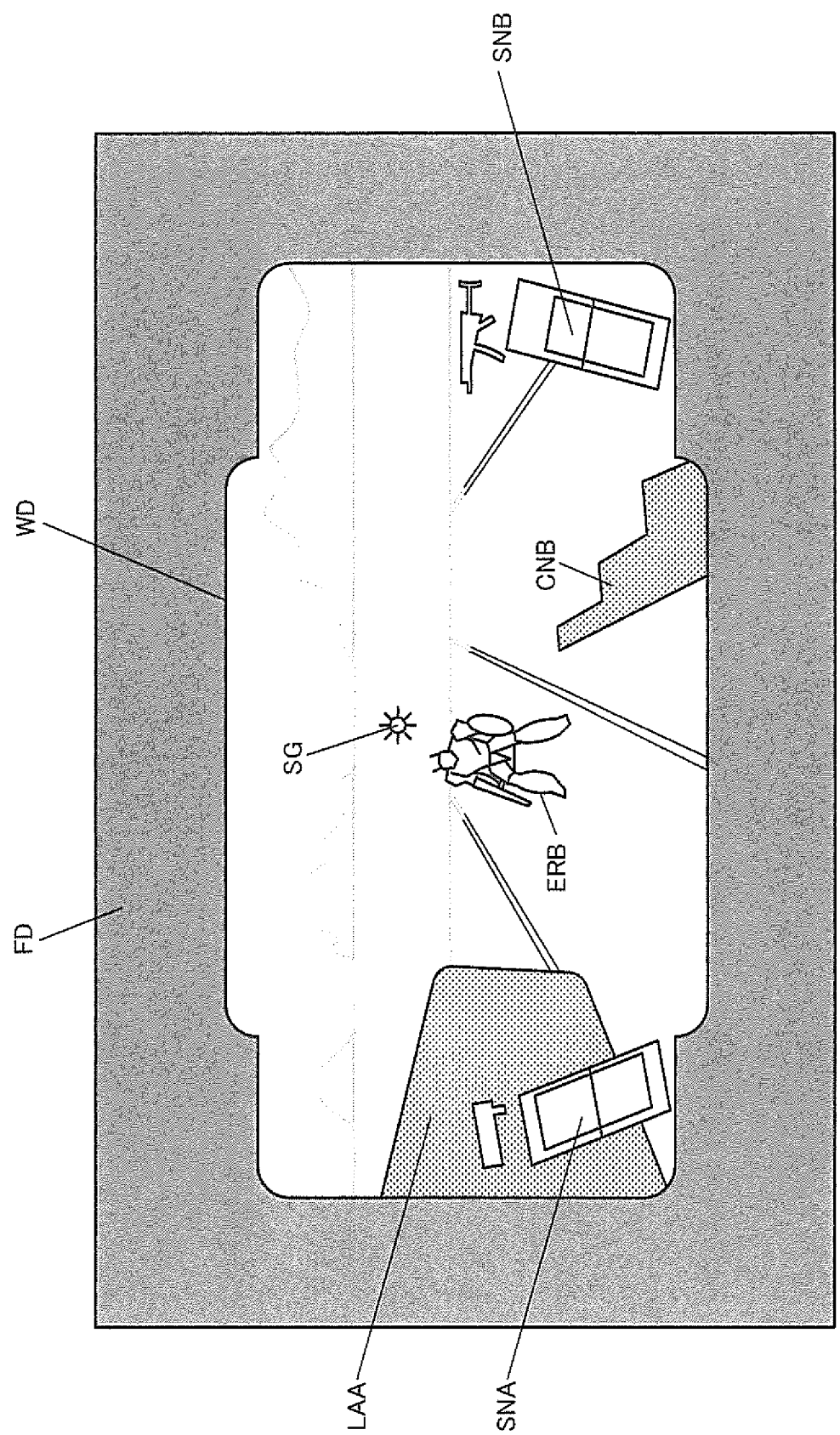
FIG. 6 illustrates an example of a game image in the robot simulator.

FIG. 5B and FIG. 6 illustrate an example of a game image generated by the robot simulator according to the present embodiment. As shown in these game images, the hood FD of a Visual Flight Rules cockpit of the robot RB in the virtual world is provided with a window WD, through which the user can see the outside. On the window WD in FIG. 6, an enemy robot ERB, cross hairs SG, and a map of the battle field are displayed. Furthermore, missile launcher LAA and cannon CNB as weapons of the robot RB operated by the user, and ammunition counter icons SNA and SNB indicating the remaining ammunitions of these weapons are displayed.

The cross hairs SG move to follow the movement of the line-of-sight (head, HMD) of the user wearing the HMD 200. For example, the cross hairs SG on the game image move rightward when the user turns his or her head rightward, and move leftward when the user turns his or her head leftward. The user enjoys the battle game by moving the position of the cross hairs SG to the position of the enemy robot ERB, and attacking the enemy robot by firing the launcher LAA and/or the cannon CNB.

The game image as illustrated in FIG. 5B is displayed when the user directs his or her line-of-sight downward by tilting his or her head downward as he or she is nodding. The game image illustrated in FIG. 5B is displayed to show a display DIS, operation levers LVL and LVR, and hands HL and HR of the virtual user PLV. When the user in the real world operates the operation section 160 (left and right hand operation levers), an image of the hands HL and HR of the virtual user PLV in the virtual world operating the operation levers LVL and LVR is displayed accordingly. Thus, the user can feel as if he or she is actually operating a real robot, and thus largely improved virtual reality can be provided to the user.

For example, the game image in FIG. 6 may be provided by attaching a left-eye virtual camera and a right-eye virtual camera to an outer shell of the robot RB in the virtual world and by displaying (projecting) an image as viewed from the left-eye virtual camera on a part of the window WD for the user's left-eye image and displaying (projecting) an image as viewed from the right-eye virtual camera on a part of the window WD for the user's right-eye image.

Thus, with the simulation system according to the present embodiment, the Virtual Reality (VR) world as the virtual space spreads entirely in every direction around the user. For example, the user facing forward toward the front side can see the enemy robot ERB and the scenery through the window WD provided to the food FD of the cockpit CKP of the robot RB in the virtual world as illustrated in FIG. 6. When the user looks down, the display DIS provided to the cockpit CKP as well as the hands HL and HR of the virtual user PLV operating the operation levers LVL and LVR can be seen as illustrated in FIG. 5B. Thus, the user can feel as if he or she is sitting in a cockpit of a real robot and operating the robot, and thus largely improved virtual reality can be provided to the user.

Figure 7A:
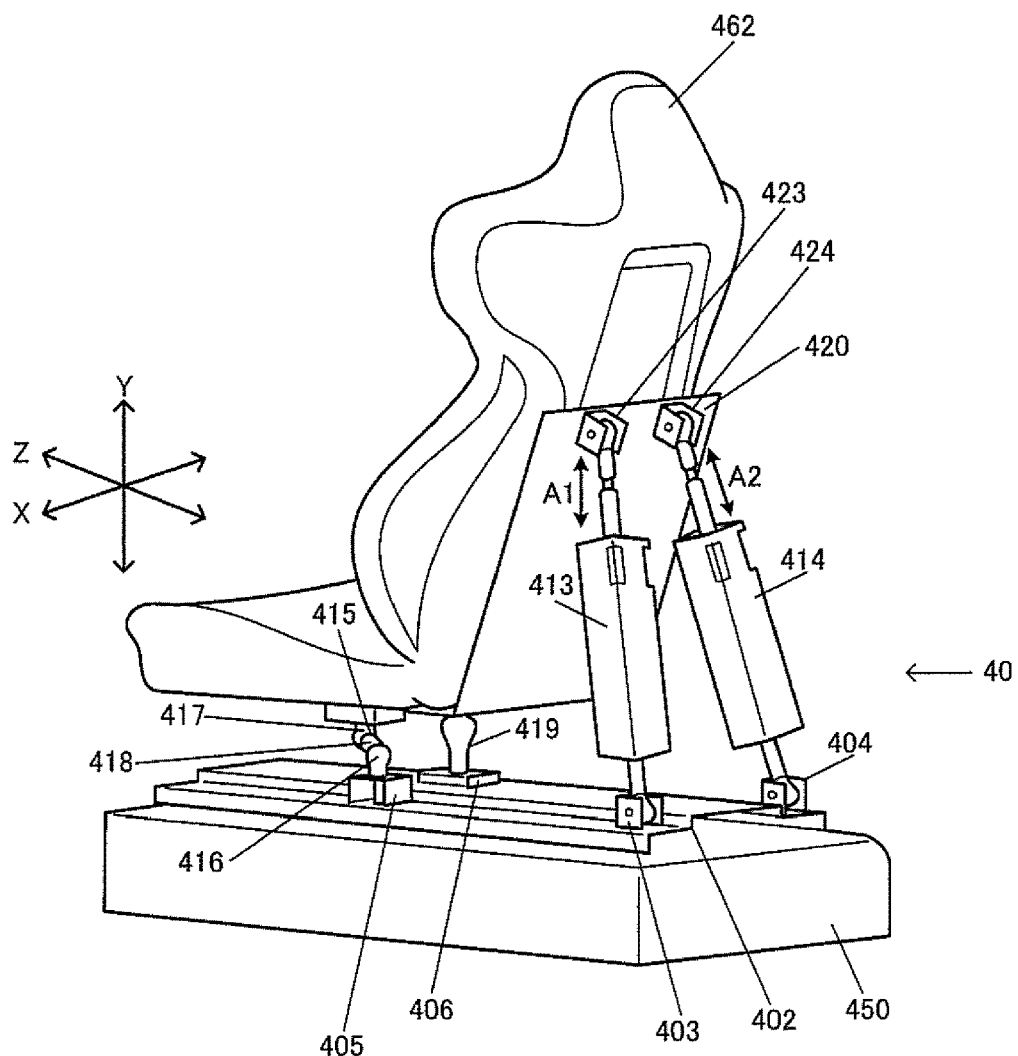
FIG. 7A and FIG. 7B are diagrams illustrating an operation of a movable casing using electric cylinders.

FIG. 7A is a diagram schematically illustrating an operation of the movable casing 40 (movable mechanism). In FIG. 7A, the configurations such as the cover section 451, the base section 452, and the seat support section 464 in FIG. 4 are omitted for the sake of simplicity of the description. For example, although a case where the electric cylinders 413 and 414 cause the rotational movement of the seat 462 (ride section 460) is described with reference to FIG. 7A, the base section 452 in FIG. 4, the seat 462, and the like integrally make the rotational movement.

As illustrated in FIG. 7A, the movable casing 40 includes the electric cylinders 413 and 414 serving as an actuator. The electric cylinders 413 and 414 make their rod sections linearly move as illustrated in A1 and A2 based on a control signal that is an electric signal from the processing device, whereby an operation of changing the direction (orientation) of the seat 462 is implemented. Specifically, the operation is implemented to change the direction (orientation) of the base section 452 to which the seat 462 (ride section 460) is attached as illustrated in FIG. 4.

A base 402 provided with hinge sections 403 and 404 is provided to the bottom section 450 of the movable casing 40. The electric cylinders 413 and 414 have one ends attached to the base 402 via hinge sections 403 and 404. Specifically, the hinge sections 403 and 404 support the one ends of the electric cylinders 413 and 414 to enable the electric cylinders 413 and 414 to pivot about the X axis extending in the horizontal direction. An attachment member 420 provided with hinge sections 423 and 424 is provided on a back surface side of a backrest section of the seat 462. The electric cylinders 413 and 414 have the other ends attached to the attachment member 420 via the hinge sections 423 and 424. Specifically, the hinge sections 423 and 424 support the other ends of the electric cylinders 413 and 414 to enable the electric cylinders 413 and 414 to pivot about the X axis.

The base 402 is provided with the hinge sections 405 and 406 to which one ends of support sections 415 and 419 are attached. The support sections 415 and 419 have the other ends attached to a seating section (back surface) of the seat 462. More specifically, the support section 415 includes link balls 416 and 417 and a link shaft 418 that restricts a movement in a yaw direction (turning). The support section 419 includes a link ball. The support sections 415 and 419 are actually provided on the inner side of the cover section 451 in FIG. 4.

Figure 7B:
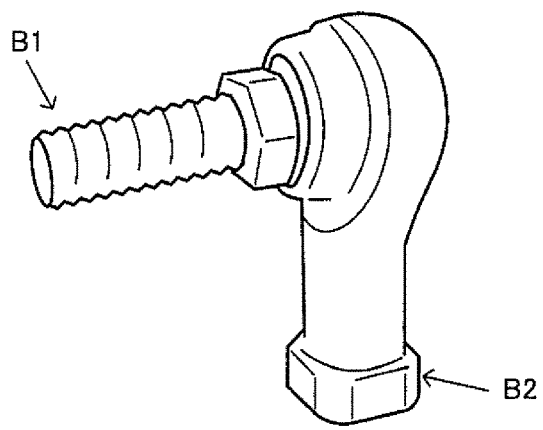

FIG. 7B illustrates an example of the link ball as a part of the support section 419 and the like. The support section 419 has a male screw side illustrated in B1 in FIG. 7B fixed to the side of the seat 462 (movable side), and has a female screw side illustrated in B2 fixed to the side of the bottom section 450 (fixed side).

With the support section 419 being such a link ball that is a spherical sliding bearing member, the rotational movement corresponding to pitching, rolling, and yawing can be implemented. In FIG. 7A, the rotational movement corresponding to yawing is limited with the support section 415 including the link shaft 418 and the like provided. This link shaft 418 may employ an electric cylinder and the like to be capable of extending and contracting, the rotational movement corresponding to yawing can also be controlled.

For example, in FIG. 7A, when the rod sections of the electric cylinders 413 and 414 are both contracted, the seat 462 (base section 452) is pitched about the X axis so that a backward leaning motion of the user is implemented. For example, in FIG. 4, this rotational movement corresponding to pitching causing the user to lean backward is implemented so that the user who depressed the accelerator pedal 163 to accelerate the movement of the robot can feel the acceleration.

When the rod sections of the electric cylinders 413 and 414 are both extended, the seat 462 (base section 452) is pitched about the X axis so that a forward leaning motion of the user is implemented. For example, in FIG. 4, this rotational movement corresponding to pitching causing the user to lean forward is implemented so that the user who depressed the brake pedal 164 to decelerate the movement of the robot can feel the deceleration.

When the user operates the operation levers 161 and 162 in FIG. 4 to make the robot turn right or left relative to the traveling direction, control is performed so that the rod section of one of the electric cylinders 413 and 414 is contracted and the rod section of the other one of the electric cylinders 413 and 414 is extended. Thus, the seat 462 (base section 452) rolls about the Z axis, so that the user can feel inertia involved in the movement of the robot turning right or left relative to the traveling direction.

With the acceleration, deceleration, and inertia involved in the movement of the robot, improved virtual reality can be provided to the user, and what is known as 3D sickness can be suppressed. Specifically, if an image of the robot (ridden moving body) ridden by the virtual user moving is stereoscopically displayed on the HMD 200 with almost no actual motion of the play position of the user in the real world, the user perceives a discrepancy between what he or she is sensing in the image and what his or her body feels, and thus will feel 3D sickness.

In view of this, the movable casing 40 is provided in the present embodiment to alleviate such 3D sickness. Specifically, the rotational movement (such as rolling or pitching) of the seat 462 (base section 452) of the movable casing 40 is implemented when the robot accelerates, decelerates, or makes a turn, to change the play position of the user. This will result in an event in the virtual world closer to an event in the real space, so that 3D sickness can be alleviated.

Figure 8:
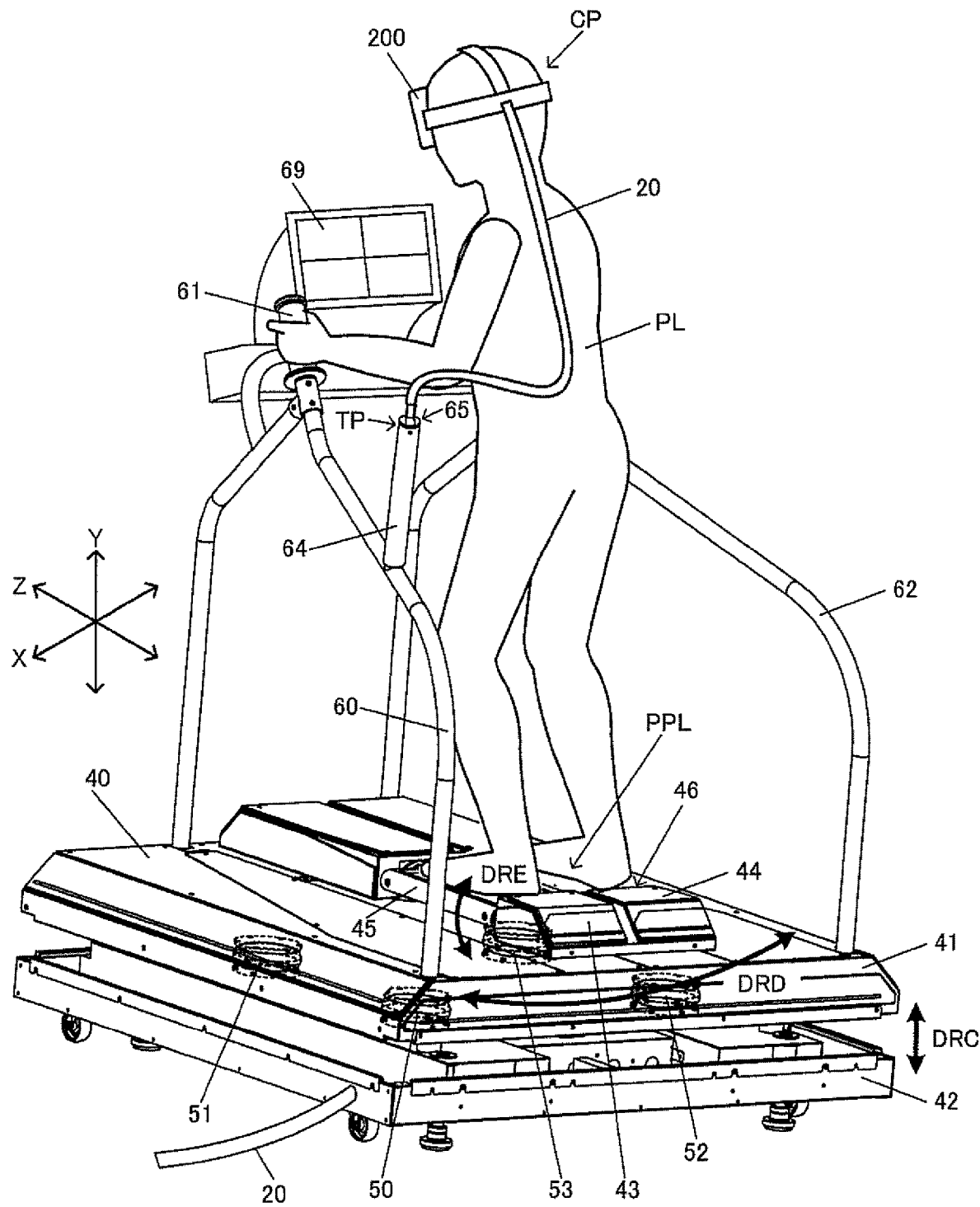
FIG. 8 illustrates a configuration example of a ski simulator that is an example of the simulation system.

FIG. 8 is a perspective view illustrating a configuration example of a ski simulator that is an example of the simulation system. The ski simulator includes the movable casing 40 including base sections 41 and 42 provided facing each other in the DRC direction. A space between the base sections 41 and 42 has the air spring sections 50, 51, 52, and 53 (extension/contraction sections in a broad sense) at its four corners. The air spring sections 50, 51, 52, and 53 extend/contract in the DRC direction with air supplied or discharged using an air compressor and bubbles.

For example, as illustrated in FIG. 8, the vertical direction corresponds to a Y axis direction, the facing direction of the user PL corresponds to a Z axis direction, and a direction orthogonal to the Y axis direction and the Z axis direction corresponds to an X axis direction. The base section 41 can be moved toward the upward side or the downward side in the Y axis direction with all of the air spring sections 50, 51, 52, and 53 extended or contracted. With these movements of the base section 41 in upward and downward direction, a condition of a snow surface on which the user skies and the like can be simulated. For example, bumps on the snow surface can be simulated with the base section 41 quickly moving upward and downward with small strokes.

Of the air spring sections 50, 51, 52, and 53 at the four corners, those on one of left and right sides may extend while those on the other side contract so that rolling of the base section 41 about the Z axis can be implemented. Of the air spring sections 50, 51, 52, and 53 at the four corners, those on one of forward and back sides may extend while those on the other side contract so that pitching of the base section 41 about the X axis can be implemented. The status of a slope skied by the user can be expressed through such rolling and/or pitching.

The movable casing 40 has operation members 43 and 44, provided with the foot pedals 45 and 46 to be stepped on by left and right feet of the user PL, rotatably attached to the base section 41. Specifically, the operation members 43 and 44 makes a swing movement (swinging) in a DRD direction in FIG. 8. This swing movement enables yawing about the Y axis. The foot pedals 45 and 46 pivot in a DRE direction. Thus, rotation about the Z axis can be implemented.

The user PL performs an operation using the operation members 43 and 44 and the foot pedals 45 and 46 with a skiing maneuver. For example, a ski operation simulating skiing in the real world is performed with a swing operation of causing the operation members 43 and 44 to make a swing movement in the DRD direction, and an edging operation of causing the foot pedals 45 and 46 to pivot in the DRE direction. As a result, the virtual user displayed on the HMD 200 performs a corresponding ski operation so that the user PL can experience virtual reality of skiing on a course in the virtual space.

The movable casing 40 is further provided with guide sections 60 and 62 having distal ends provided with holding sections 61 and 63 (the holding section 63 is not illustrated) held by the hands of the user PL. The holding sections 61 and 63 correspond to grips of skipoles in the real world. Then, the user PL enjoys the ski simulation game by making a skiing maneuver with the swing operation using the operation members 43 and 44, and an edging operation using the foot pedals 45 and 46, while holding the left and right holding sections 61 and 63 to support his or her body.

Wind blows from a wind tunnel 69 provided in front of the user PL so that virtual reality providing a realistic feeling of the wind against his or her body while skiing can be implemented. The guide section 60 also guides a cable 20, from the processing device (a device including the processing section 100 and the storage section 170 in FIG. 1. for example, a game device or a personal computer (PC)) for generating the display image on the HMD 200, from the lower side to the upper side along a predetermined route. The cable 20 passes through a support guide 64 and is drawn out from a cable drawing port 65 as the via point TP to be connected to the HMD 200.

The apparatus implementing the simulation system according to the present embodiment is not limited those illustrated in FIG. 4 and FIG. 8. For example, the simulation system according to the present embodiment can be applied to various apparatuses using an HMD as a display section including a consumer game apparatus, an arcade game apparatus, a PC, a portable information terminal, and a large attraction system where a large number of users play the game. The simulation system according to the present embodiment can be implemented with a server system to which a plurality of terminal devices (such as a game device, a PC, and a portable information terminal) are communicably connected through a network. In such a case, the processes according to the present embodiment may be implemented as a process performed by the simulation system and the terminal device in cooperation.

4. Method According to the Present Embodiment

Next, a method according to the present embodiment will be described in detail. The method according to the present embodiment is described below mainly based on an example where the method is applied to the robot simulator illustrated in FIG. 4. The present embodiment is not limited to this and can be applied to various games (a roll playing game (RPG), an action game, a battle game, a racing game, a sport game, a thriller experience game, a simulation game for rides such as trains and aircrafts, a puzzle game, a communication game, or a music game) and to something other than games. The following description is given based on an example where the moving body is a ridden moving body such as a robot ridden by the virtual user (character). However, the moving body may be the virtual user (a skier in FIG. 8 for example) corresponding to the user.

4.1 3D Sickness

Figure 9:
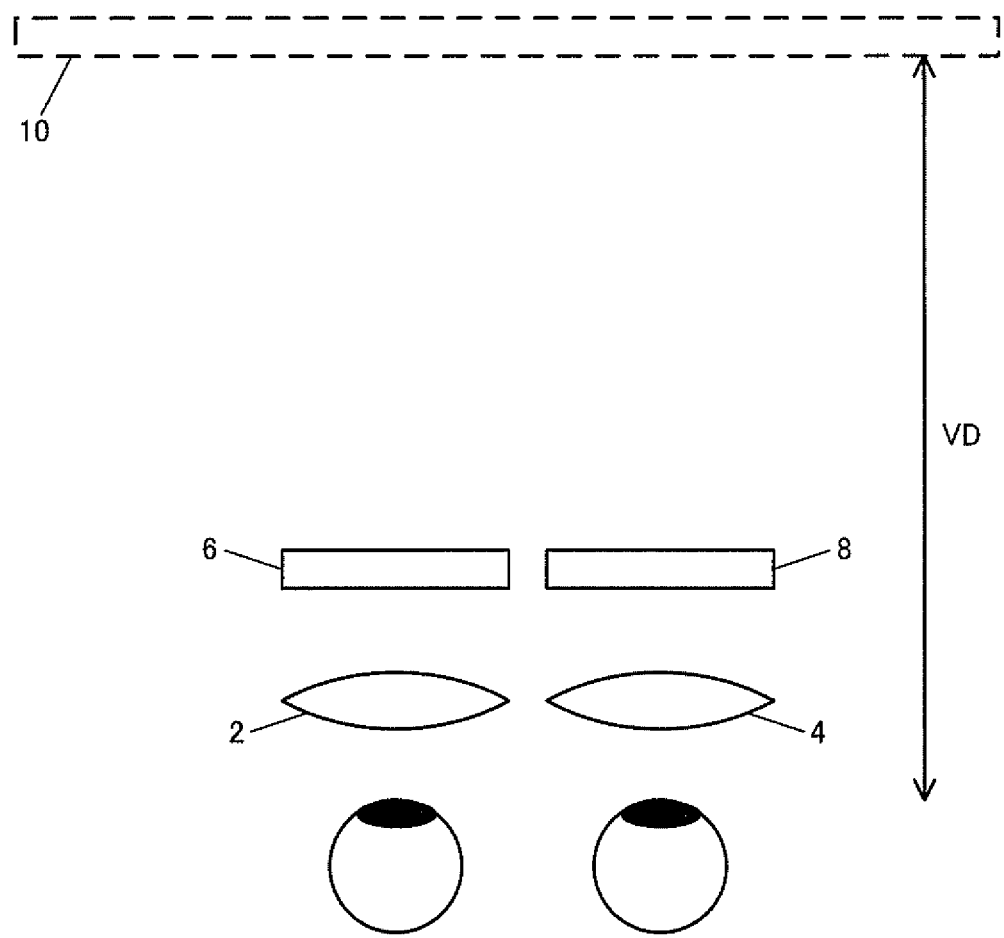
FIG. 9 is a diagram illustrating a configuration example of an optical system of the HMD.

FIG. 9 is a diagram illustrating a configuration example of the optical system of the HMD. Eyepieces 2 and 4 as well as displays 6 and 8 are respectively provided in front of the left and the right eyes of the user. The displays 6 and 8 respectively display left-eye and right-eye images for stereoscopy. A distance between the centers of lenses of the eyepieces 2 and 4 is set to a distance corresponding to an inter-camera distance between first and second virtual cameras for generating the left-eye and the right-eye images for example. The left-eye and the right-eye images may be respectively displayed on first and second display areas of a single display.

With such eyepieces 2 and 4 provided, a virtual screen 10 which is a virtual display can be recognized as being at a position distant by a virtual visual distance VD (visual distance). For example, an image showing a display object with no parallax in stereoscopy at the position of the virtual screen 10 is displayed. With such a configuration, the virtual visual distance VD and the screen size of the virtual screen 10 can be adjusted by changing focus distances of the eyepieces 2 and 4 and the like for example.

Figure 10:
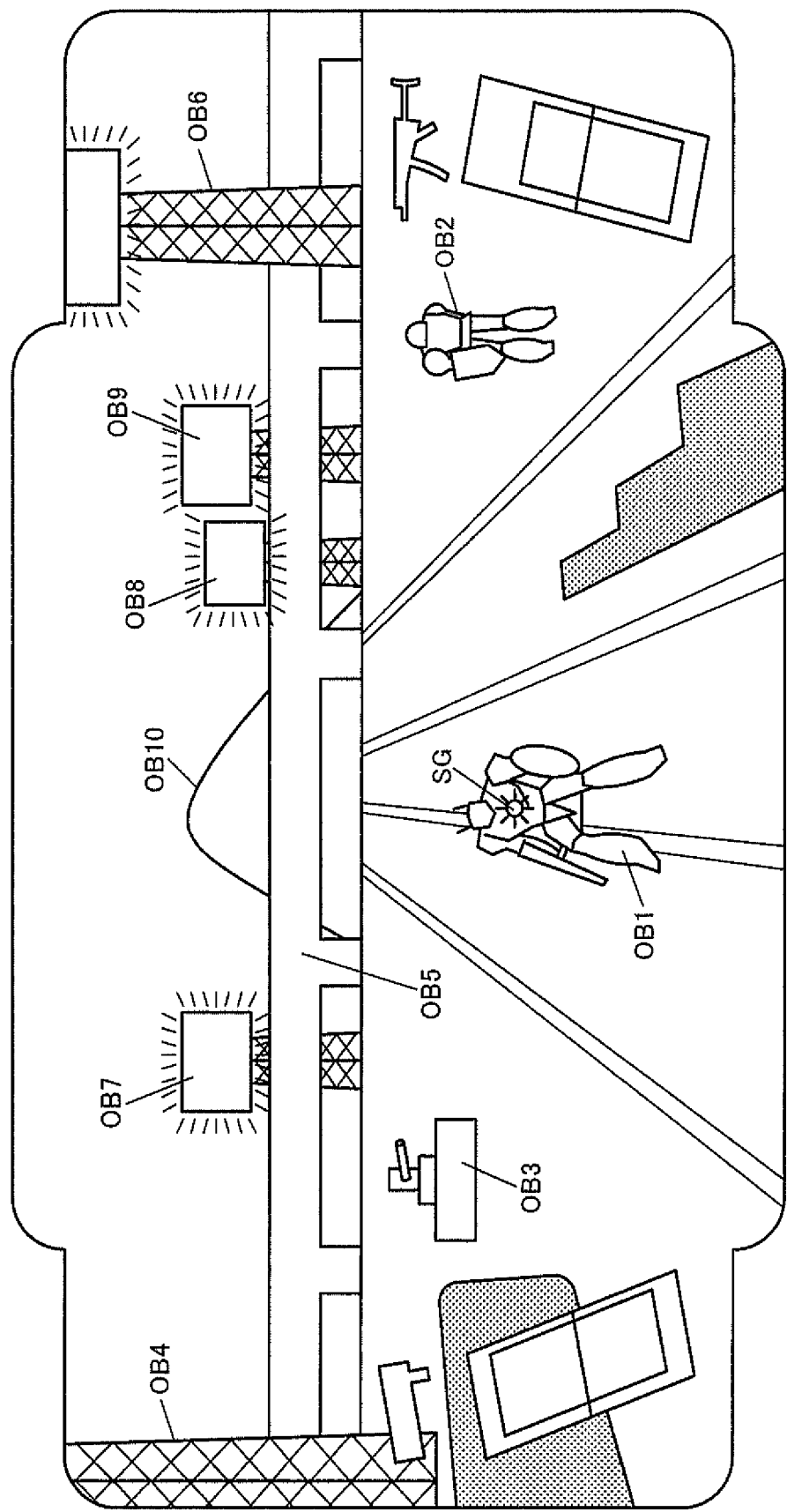
FIG. 10 is an example of a game image generated by a method according to Comparative Example.

FIG. 10 illustrates an example of a game image generated by a method according to Comparative Example for the present embodiment. In the method according to this Comparative Example, the image effect process for motion sickness prevention as in the present embodiment is not performed, and an image as viewed from the virtual camera (an image generated by the rendering process) is directly displayed on the HMD. Thus, all of display objects OB1 to OB10 on the game image are displayed as in-focus images. When an image as viewed from the virtual camera is thus directly displayed on the HMD, the brain perceives a state where all of the display objects OB1 to OB10 that are at close and far positions as viewed from the virtual camera are clearly seen, and tries to get information about all of them, resulting in too much information causing 3D sickness. Note that 3D sickness is a sort of motion sickness including dizziness that occurs when a person keeps watching a video with intense stereoscopic movement. For example, with human eyes in the real world, an object gazed at with the eyes is in focus, but objects in the periphery of the gazed object are actually slight blurred. Thus, the image as illustrated in FIG. 10 with the display objects OB2 to OB10 other than the display object OB1 (enemy robot) gazed at by the user (virtual user) also displayed as in-focus images is different from an image seen with the eyes in the real world. Thus, this image which is unnatural to the user causes eye tiredness to be a cause of 3D sickness or the like. Such occurrence of 3D sickness would make it difficult for the user to play a game for a long period of time or would even make the user hesitate to play the game again, and thus compromises the attractiveness and utilization rate of the simulation system.

Figure 11:
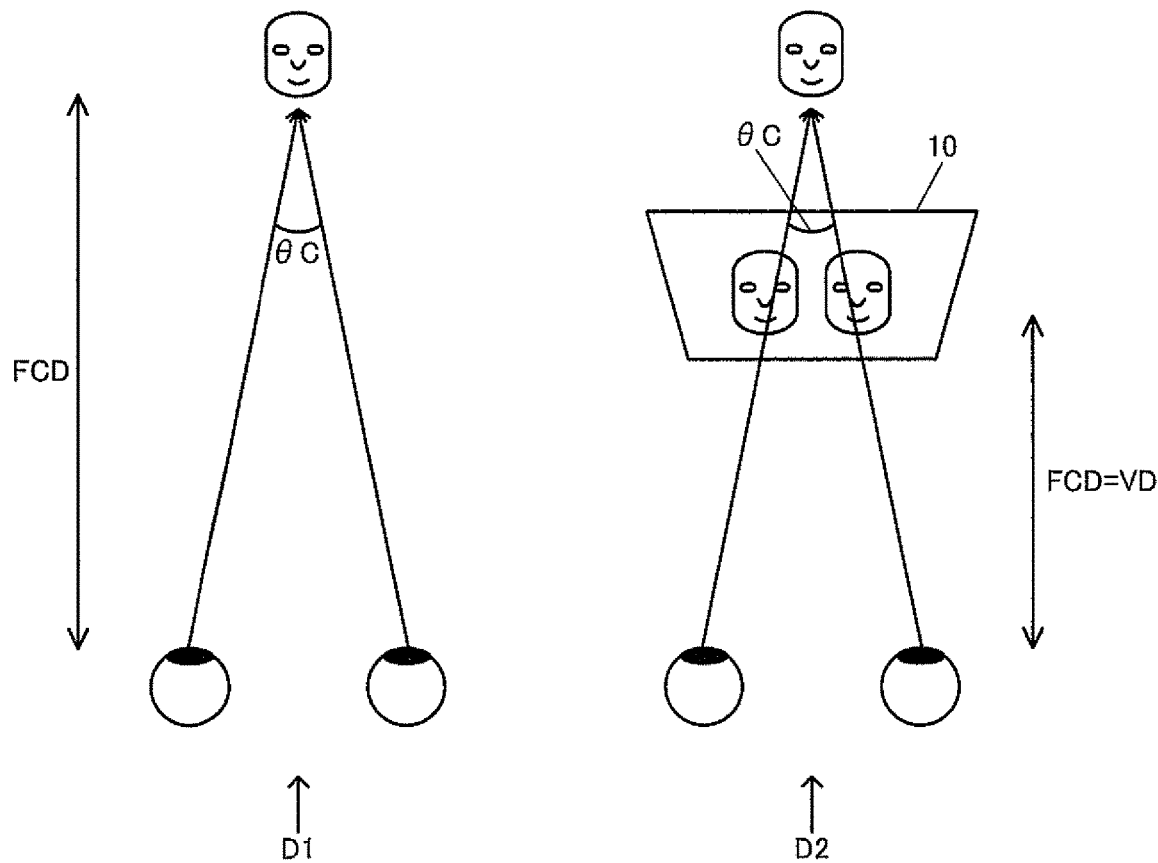
FIG. 11 is a diagram illustrating a problem of 3D sickness.

As illustrated in D1 in FIG. 11 for example, a person in the real world recognizes the depth position and the like of an object through an adjustment of a focus distance FCD of the eye (adjustment of a lens of the eyeball) and through an adjustment a convergence angle θC that is an intersection angle between the lines-of-sight of both eyes. In other words, a sense of depth and a three-dimension sense are recognized with an adjustment demand for adjusting the focus distance FCD of the eye and a convergence demand for adjusting the convergence angle θC.

As illustrated in D2 in FIG. 11, stereoscopy on the other hand is implemented with images with parallax displayed on the virtual screen 10 so that images of display objects are fused to be on a far side and near side of the virtual screen 10. In this case, the virtual screen 10 is positioned at the virtual visual distance VD, whereby the focus distance of the eyes satisfies FCD=VD, whereas the convergence angle θC is adjusted so that the lines-of-sight of both eyes intersect at the position of the fused display object. Thus, in the stereoscopy, the three-dimensional feel is mainly created by parallax, and the adjustment of the focus distance FCD of the eyes is an ignored concept. Specifically, when the display objects are fused on a far side and a near side of the virtual screen 10 with the parallax between the left-eye image and the right-eye image, the convergence angle θC is adjusted accordingly but the focus distance of the eyes stays in a constant state where FCD=VD is satisfied. Thus, discrepancy from the eye movement in the real world occurs, leading to unnaturalness that results in 3D sickness and the like.

For example, in the game image illustrated in FIG. 10, the user trying to gaze at the display objects OB5 to OB10 far from the virtual camera will see these display objects OB5 to OB10 with only the convergence angle θC adjusted and the focus distance FCD kept constant as illustrated in D2 in FIG. 11. Thus, the user is forced to move his or her eyes in a manner different from the eye movement in the real world. For example, as described above with reference to D2 in FIG. 11, the adjustment demand is fixed and the convergence demand is variable in the stereoscopy. The real image for implementing the stereoscopy requires the user to move his or her eyes to direct the line-of-sight to the display objects OB5 to OB10 with various different depth values while being displayed on the virtual screen 10 with the optically same virtual visual distance VD maintained. Thus, when the multiple display objects OB5 to OB10 with different depth values are displayed on the game image, the user needs to make an unnatural movement of the eyes every time he or she gazes at such display objects. This results in a problem that the user will feel 3D sickness.

4.2 Image Effect Process

Figure 12:
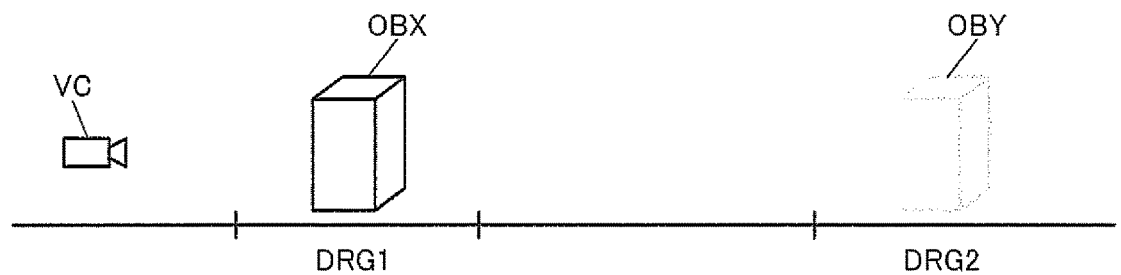
FIG. 12 is a diagram illustrating a method according to the present embodiment.

To solve the problem described above, the present embodiment employs a method of performing an image effect process for motion sickness prevention. Specifically, as illustrated in FIG. 12, the image effect process for motion sickness prevention is performed as a process of blurring, compared with a display object OBX in a given distance range DRG1 from the virtual camera VC, an image of a display object in a distance range DRG2 farther than a given distance range DRG1. For example, the image effect process for motion sickness prevention is performed on the image generated by the rendering process to be an image as viewed from the virtual camera, to blur the image of a display object OBY in the distance range DRG2 far from the virtual camera VC. For example, an in-focus image (focus image) is generated for the display object OBX in the distance range DRG1 (first distance range), whereas a blurred image (defocus image) is generated for the display object OBY in the distance range DRG2 (second distance range). The distance range is a range of distance (Z) in the depth direction of the virtual camera VC. A distance (depth distance) at which the blurring process for the display object starts can be set to be any distance.

Figure 13:
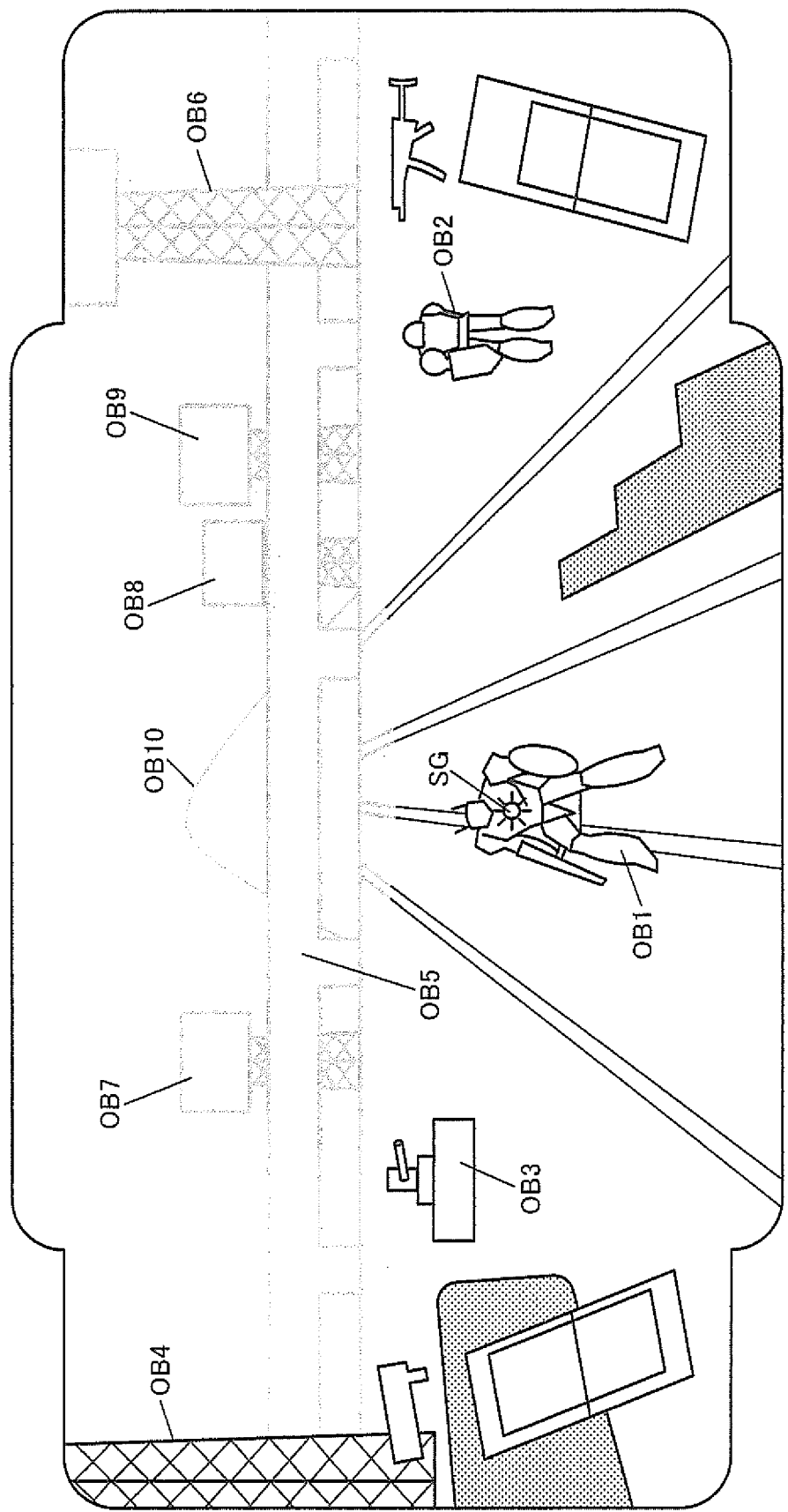
FIG. 13 illustrates an example of a game image generated by the method according to the present embodiment.

FIG. 13 illustrates an example of a game image generated by the method according to the present embodiment. In FIG. 13, the display objects OB1 to OB4 at close distances from the virtual camera are not displayed as a blurred image. For example, the display objects OB1 to OB4 are displayed as an in-focus image. On the other hand, the display objects OB5 to OB10 at long distances from the virtual camera are displayed as a blurred image due to the image effect process. For example, the display objects OB5 to OB10 are displayed as out-of-focus objects. Note that the display objects OB1 and OB2 represent enemy robots, the display object OB3 represents an enemy cannon, the display object OB5 represent a bridge, the display objects OB4, OB6, OB7, OB8, and OB9 represent lighting towers, and the display object OB10 represents a mountain.

As described above, in FIG. 13, in-focus clear images are generated for the display objects OB1 to OB4 which are near as viewed from the virtual camera (from the point-of-view of the virtual user). Thus, the user can smoothly play the game with the display objects OB1 to OB4 serving as gaze targets. For example, a game of setting cross hairs SG on the display objects OB1 and OB2 representing the enemy robots, and the display object OB3 representing the enemy cannon and attacking them can be enjoyed.

On the other hand, out-of-focus blurred images are generated for the display objects OB5 to OB10 that are far as viewed from the virtual camera. Thus, the user can be effectively prevented from feeling 3D sickness by gazing at these display objects OB5 to OB10. Specifically, the image effect process as illustrated in FIG. 12 is performed when the user wearing the HMD sees a scenery of the virtual space, so that an image as illustrated in FIG. 13 can be displayed in which a center portion of the screen is in focus and a portion other than the center portion is blurred. Thus, the user mind will be set towards directing the line-of-sight to the screen center portion only, so that the line-of-sights of the eyes will be focused at that point (convergence). As a result, the user's line-of-sight would not be directed to various points outside the screen center portion, whereby 3D sickness can be prevented. Furthermore, there is an advantage that an image that the user feels natural can be displayed because the image with the gaze location at the screen center portion being clear and the periphery being blurred is close to the vision of the human's eyes.

For example, a beginner or an elementary level user would try to see display objects at a circumference portion outside the screen center portion, with his or her eyes restlessly moving with the head facing forward toward the screen center portion. In such a case, if the display objects at the circumference portion are displayed as in-focus images, the eye movement involving a change in the convergence angle θC with the focus distance FCD kept constant occurs to cause 3D sickness, as described above with reference to D2 of FIG. 11.

In this respect, with the method according to the present embodiment, the display object (such as OB1) in the screen center portion is displayed as a clear object, and the display objects (OB5 to OB10) at the circumference portion are displayed as blurred images as illustrated in FIG. 13. Thus, the eye movement of the user restlessly moving his or her eyes to change the convergence angle θC can be prevented, whereby the 3D sickness can be effectively prevented.

Figure 14A:
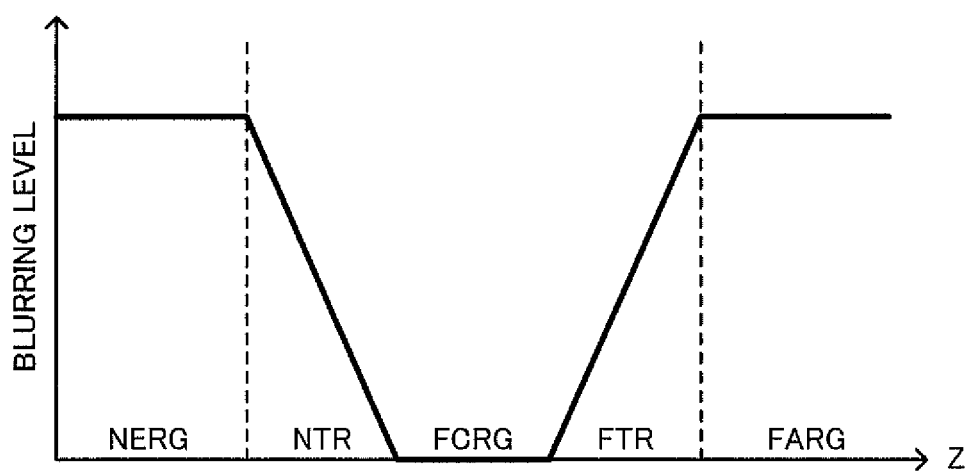
FIG. 14A and FIG. 14B are diagrams illustrating a depth of field process performed as an image effect process according to the present embodiment.

In the present embodiment, a depth of field process is performed as the image effect process for example. The depth of field process may employ Gaussian DOF in the Unreal Engine. FIG. 14A is a diagram illustrating the depth of field process. For example, in the Unreal Engine, parameters such as in-focus range FCRG (focus distance), near transition range NTR, far transition range FTR, and blurring level (blurred size) can be set as illustrated in FIG. 14A. A near side blurred region NERG (near side blurred region) is a region more on the near side (closer to the virtual camera) than the near transition range NTR. A far side blurred region FARG (far side blurred region) is a region more on the farther side (farther from the virtual camera) than the far transition range FTR.

In the present embodiment, the distance range DRG1 in FIG. 12 is set to be included in the in-focus range FCRG in FIG. 14A. The distance range DRG2 is set to be included in the far side blurred region FARG. Thus, in the game image illustrated in FIG. 13, the display objects OB1 to OB4 in the distance range DRG1 (FCRG) are displayed as in-focus images, whereas the display objects OB5 to OB10 in the distance range DRG2 (FARG) are displayed as blurred images as a result of the depth of field process. Thus, the depth of field can be effectively utilized to implement the image effect process for motion sickness prevention.

Figure 14B:
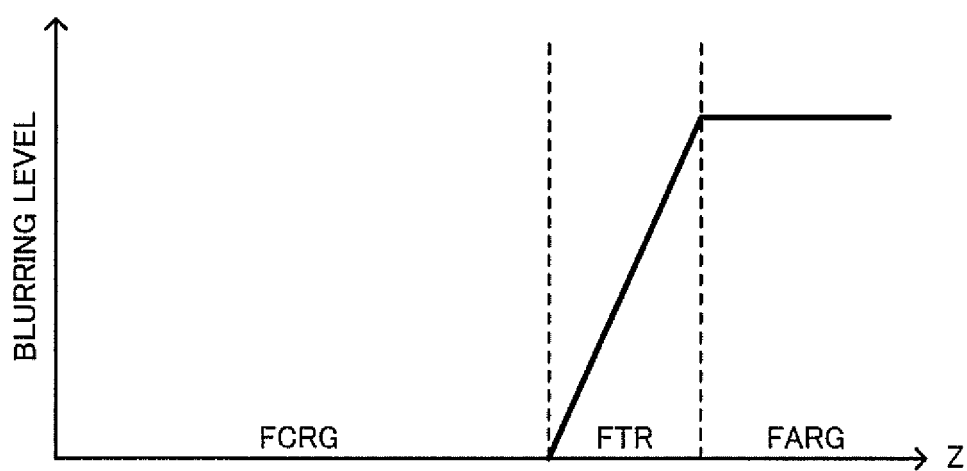

More specifically, in the present embodiment, as illustrated in FIG. 14B, the distance range DRG1 in FIG. 12 is included in the in-focus range FCRG of the depth of field, and the blurring process is set not to be performed in the region more on the near side than the in-focus range FCRG as viewed from the virtual camera. Thus, the near side blurred region NERG is nullified without setting the near transition range NTR in FIG. 14A. Then, the depth of field process is performed so that the blurring process is performed on display objects in a region farther than the in-focus range FCRG. For example, the far transition range FTR in FIG. 14A is set and the far side blurred region FARG is activated. This far side blurred region FARG corresponds to the distance range DRG2 in FIG. 12 for example.

With this configuration, as illustrated in FIG. 13, in-focus images are generated for the display objects OB1 to OB4 that are close as viewed from the virtual camera, and out-of-focus blurred images are generated for the display objects OB5 to OB10 that are far as viewed from the virtual camera.

For example, the depth of field process is generally used for generating a photorealistic image. For example, with the depth of field process, a lens simulation image is generated in which only a display object as a gaze target such as a car or an idol is in focus, and other display objects are displayed as blurred images. The depth of field process is not constantly performed, but is performed only in a situation where a display object as the gaze target such as a car or an idol appears. Thus, the depth of field process is performed to generate a photorealistic image as if it was viewed through a camera lens. In addition, in the Unreal Engine, the depth of field process has been recommended not to be used for generating images for HMDs, because the resultant image may be unpleasant to the user.

In this context, in the present embodiment, the depth of field process is not used for expressing a photorealistic image as described above, and is used for preventing the user from feeling 3D sickness. Thus, the parameters are not set for achieving an image with photorealistic expression as described above, and are set so that display objects that are relatively close to the virtual camera are in focus, and far display objects are blurred. In the present embodiment, the depth of field process is used for generating images for HMDs, although such a utilization is not recommended by the Unreal Engine.

For example, in the depth of field process for high-fidelity lens simulation, the blurring process is performed also in display objects in the near side blurred region NERG. On the other hand, in the method illustrated in FIG. 14B, the near side blurred region NERG is nullified, and the far side blurred region FARG is activated, so that a process of blurring far display object only is implemented. Thus, the display object at positions close to the virtual camera would not be displayed as blurred images, and the user can play the game with natural feeling. Furthermore, a modification where the near side blurred region NERG is set as the target to perform the blurring process on a display object very close to the virtual camera may be implemented.

The depth of field process for an image with photorealistic expression is performed only in a certain situation such as the situation where a car or an idol appears as described above. On the other hand, in the present embodiment, the depth of field process is constantly performed after the game starts. Specifically, the depth of field process is constantly performed in a gameplay period between a timing at which an image of a game stage is displayed with a moving body (virtual user, ridden moving body) corresponding to the user appeared on the game stage, and the end of the game. With the depth of field process constantly performed during the gameplay period, the user can be effectively prevented from feeling 3D sickness during the gameplay period.

In the present embodiment, the width of the in-focus range FCRG of the depth of field may be changed in accordance with the movement status of the moving body. For example, the in-focus range FCRG of the depth of field is set to be narrower for higher speed and/or acceleration of the robot, the virtual user, and the like.

Figure 15A:
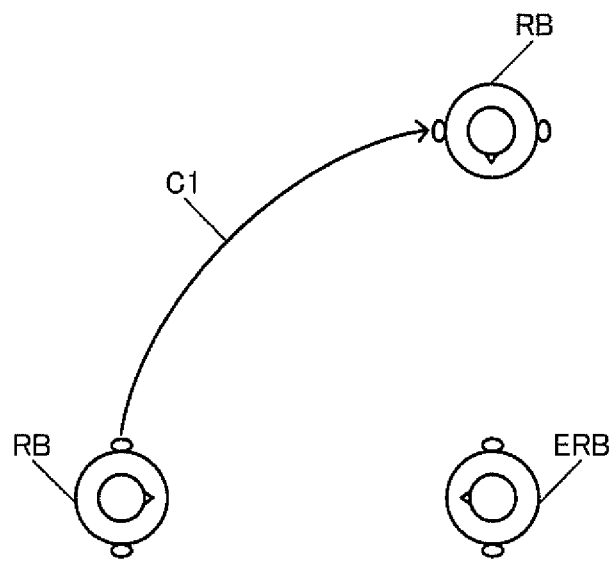
FIG. 15A and FIG. 15B are diagrams illustrating a method of changing the width of an in-focus range of the depth of field in accordance with the movement status of a moving body.
Figure 15B:
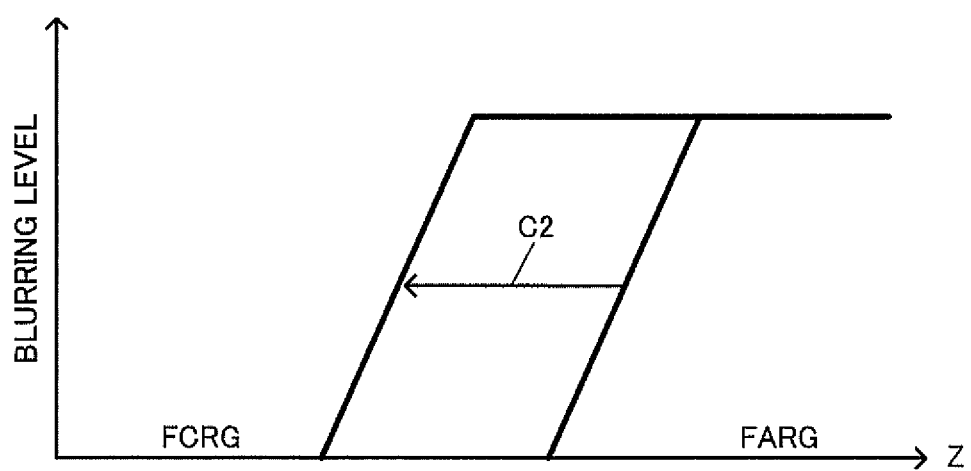

For example, as illustrated in C1 in FIG. 15A, the robot RB of the user is making a rotational movement about the enemy robot ERB. The robot simulator according to the present embodiment enables such a rotational movement to be easily performed through an operation on the operation levers 161 and 162 in FIG. 4. In a situation where the robot RB of the user makes a fast rotational movement about the enemy robot ERB, the in-focus range FCRG of the depth of field is narrowed as illustrated in C2 in FIG. 15B. Thus, an image in which only the enemy robot ERB close to the robot RB of the user is in focus is generated, and the other display objects are displayed as blurred images.

With this configuration, in a situation where the multiple display objects other than the enemy robot ERB move across the screen due to the rotational movement of the robot RB of the user, these display objects are displayed as blurred images, whereby the user can be effectively prevented from feeling 3D sickness. Specifically, in such a situation, the user is highly likely to feel 3D sickness if he or she tries to set his or her line-of-sight on these multiple display objects other than the enemy robot ERB moving on the screen at a high speed. In view of this, in the present embodiment, when the movement status of the robot RB transition to a predetermined state (such as high-speed rotational movement), display objects other than the enemy robot ERB gazed at by the user are displayed as blurred images. Thus, the user can be effectively prevented from setting his or her line-of-sight to such display objects, and thus can be effectively prevented from feeling 3D sickness.

In the present embodiment, a fog process may be performed as the image effect process for motion sickness prevention. This process may be a fog process in which a fog color can be designated, or may be a fog process in which the fog color needs not to be designated.

For example, FIG. 16 illustrates a setting example of a parameter of the fog process in which the fog color can be designated. In FIG. 16, the fog color and the level of the fog process (blurring level) can be set in each game stage for example. For example, the fog color is set to be black in a game stage in night time, and is set to be red in a game stage in evening with sunset. In a case of such a fog process in which the fog color can be set, the depth of field process and the fog process are preferably both performed as the image effect process. With this configuration, the display object (far display object) at a long distance from the virtual camera will be displayed as a blurred image due to the depth of field process, and will have a color close to a predetermined color due to the fog process. As a result, the far display object becomes less noticeable so that the user can be more effectively prevented from watching the display object with his or her restlessly moving eyes. Only the fog process may be performed as the image effect process for motion sickness prevention. For example, a fog process (for environmental fog and the like) in which the fog color cannot be set is performed as the image effect process for motion sickness prevention. In such a case, various parameters of the fog process are preferably set so that an image with a blurring similar to that in the case of the lens simulation in the depth of field process is generated.

Alternatively, as a modification of the present embodiment, a blur process may be performed so that blur is applied in multiple directions from the screen center portion to screen end portions (circumference portions). With this configuration, a display image can be generated to have blurring getting stronger as it gets closer to the screen end portion from the screen center portion that is free of blurring by the blur process. Thus, the line-of-sight of the user is concentrated at the screen center portion, so as not to be directed to display objects at the circumference portions, whereby the user can be effectively prevented from feeling 3D sickness.

In the present embodiment, a method may be employed in which the blurring process is not performed on the display object determined to be intersecting with the line segment extending in the line-of-sight direction from the virtual camera in the process of determining whether collision with the line segment has occurred, and is performed on the other display objects.

Figure 17:
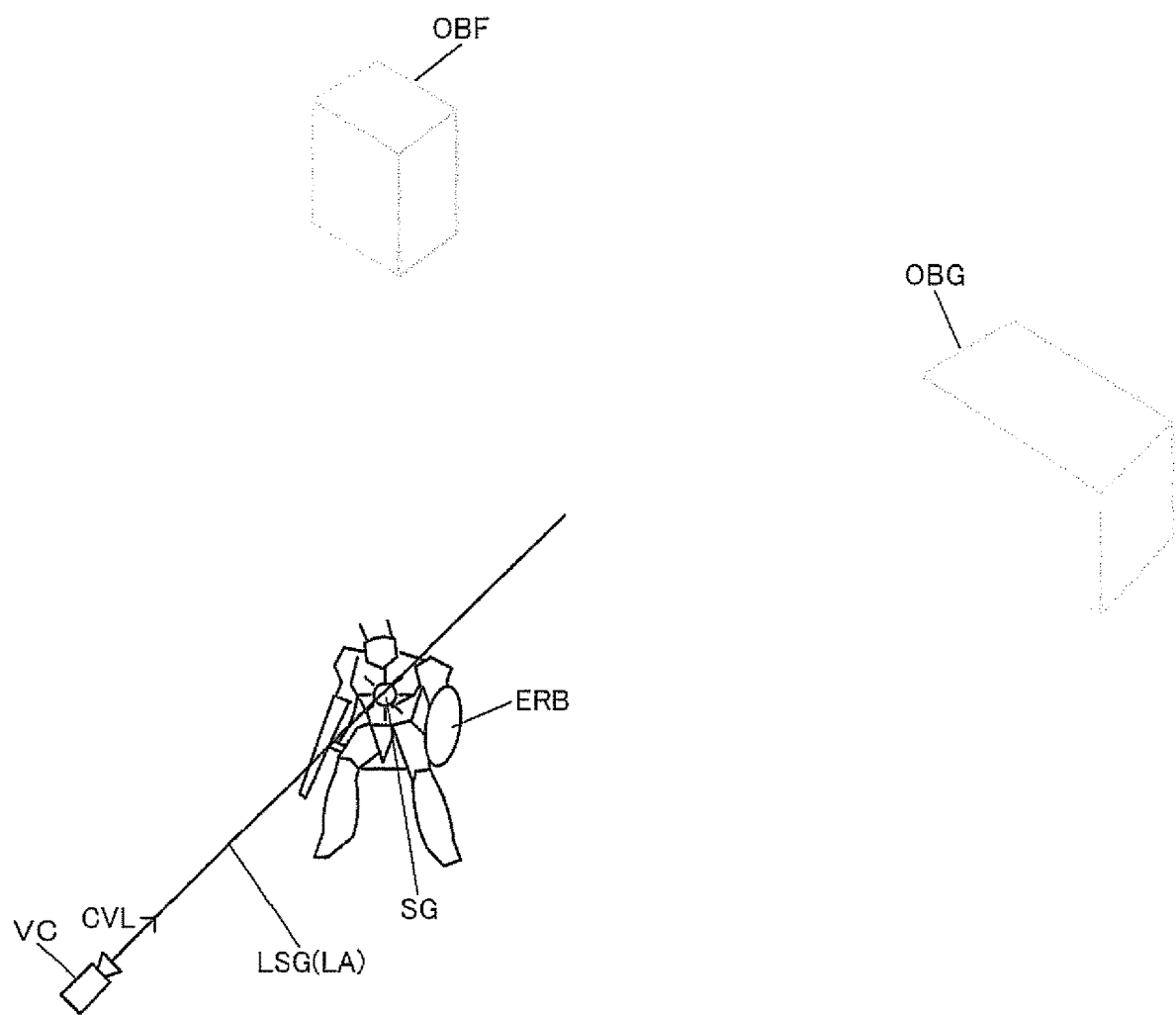
FIG. 17 is a diagram illustrating an image effect process based on determination on whether collision with a line segment has occurred.

For example, in FIG. 17, a line segment LSG for setting the cross hairs SG is set to extend along a line-of-sight direction CVL of the virtual camera VC for example. In FIG. 17, the line segment LSG is intersecting with the enemy robot ERB and thus the collision is determined to have occurred. Thus, the cross hairs SG are set to be at the intersecting position of the line segment LSG. In this case, the line segment LSG has a limited length LA, thus does not intersect with display objects OBF and OBG that are very far from the virtual camera VC. Thus, the blurring process is perfumed on these display objects OBF and OBG so that blurred images are generated.

With this configuration, the blurring process is not performed on the enemy robot ERB that is a display object gazed at by the user, and is performed on the display objects OBF and OBG not gazed at by the user. Thus, the enemy robot ERB gazed at by the user is displayed as an in-focus image, and the display objects OBF and OBG in its periphery in the field of view of the user are displayed as blurred images. Thus, the line-of-sight of the user can be prevented from being directed to the display objects OBF and OBG, whereby 3D sickness due to discrepancy of relationship between the focus distance of the eyes and the convergence angle from that in the real world can be prevented. In FIG. 17, the blurring process, which is not performed on the display object (ERB) intersecting with the line segment LSG, may also not be performed on a display object that is within a given distance range from such a display object. Thus, an image effect process can be implemented with which a display object within a given region around a gaze point of the user on the screen is displayed as an in-focus image, and a display object outside the region is displayed as a blurred image.

Figure 18A:
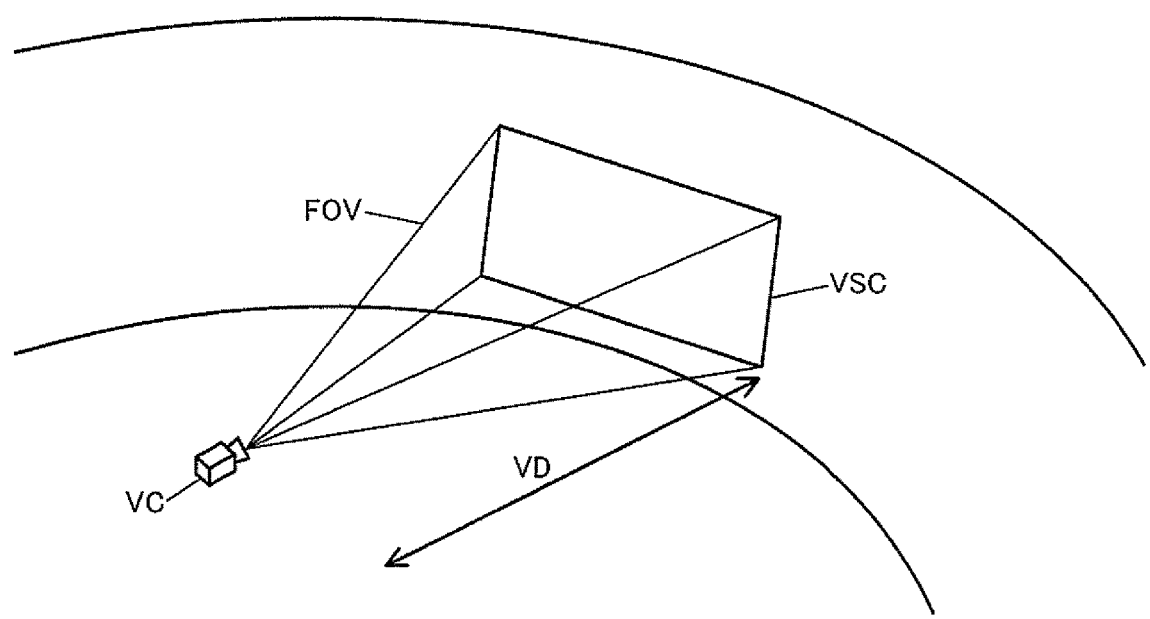
FIG. 18A and FIG. 18B are diagram illustrating a virtual visual distance and a distance range.

The distance range DRG2 in FIG. 12 can be set based on the virtual visual distance VD (visual distance) of the HMD described with reference to FIG. 9 for example. For example, in FIG. 18A, VSC denotes a virtual screen, and VD denotes a virtual visual distance corresponding to a distance between the virtual camera VC and the virtual screen VSC. As described above with reference to FIG. 10, the virtual visual distance VD is defined by the property (such as a lens focal point) of the optical system of the HMD. The field of view (FOV) corresponds to an angle of view. For example, in the present embodiment, an image with an angle of view of 110° or more can be generated. With such a wide angle of view, a VR image showing a vast VR space spreading over the entire field of view of the user can be generated.

Figure 18B:
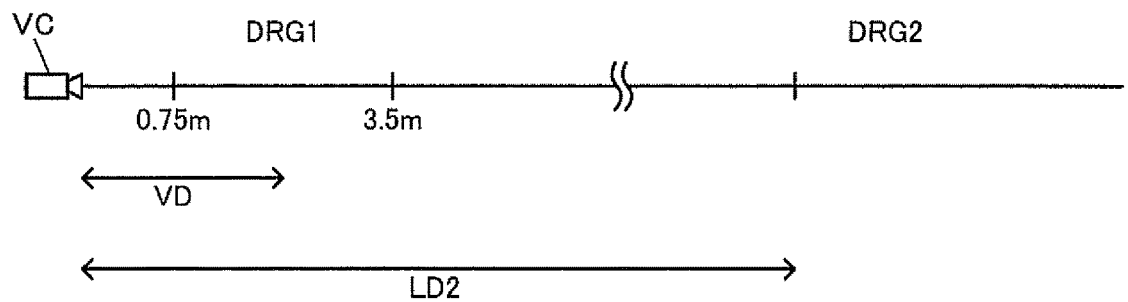

As illustrated in FIG. 18B, the distance range DRG1 described with reference to FIG. 12 is set based on the virtual visual distance VD. For example, the distance range DRG1 is set to include a position separated from the virtual camera VC by the virtual visual distance VD.

Specifically, as illustrated in FIG. 18B, the distance range DRG1 is set to be a distance range between 0.75 m and 3.5 m from the virtual camera VC. This distance is a distance in the virtual space, and the VR world is set in such a manner that the distance in the virtual space matches the distance in the real world. In the present embodiment, the blurring process is not performed on a display object in the distance range DRG1 at least between 0.75 m and 3.5 m, and is performed on a display object in the distance range DRG2 farther than the distance range DRG1. For example, in FIG. 18B, the distance range DRG2 that is the target of the blurring process is a distance range that is separated from the virtual camera VC by a distance LD2 (the distance in the depth direction). For example, the blurring process is not performed in the distance range between the position of the virtual camera VC and the position at the distance LD2, and is performed in the distance range DRG2 at and farther than the distance LD2. For example, the distance LD2 is a distance defining the far side blurred region FARG and the far transition range FTR in the depth of field process illustrated in FIG. 14A and FIG. 14B. This distance LD2 is set based on a determination standard such as the size of the game stage, how comfortable the gameplay can be played by the user and whether the user feels unnaturalness in the game image, and can be set to be a distance within a range between approximately 10 m to 80 m for example.

For example, in the HMD having the configuration as in FIG. 9, a display object (a menu display and a gaze target that is interesting to the user, for example) that is to be gazed at for a long period of time is desirably rendered to be arranged within the distance range between 0.75 m and 3.5 m in the virtual space for preventing the user from feeling eye tiredness or the like. This is because the display object within the distance range between 0.75 m and 3.5 m is extremely unlikely to be a cause of the 3D sickness, even when there is discrepancy between the relationship between the adjustment demand and the convergence demand of the eyes in D2 in FIG. 11 and that in the real world. Thus, in the present embodiment, at least a display object within a distance range DRG1 between 0.75 m and 3.5 m is not subjected to the blurring process, and thus is displayed as an in-focus image.

If the display object at a position that is farther than the distance range DRG1 between 0.75 m and 3.5 m from the virtual camera VC but is not very far from the virtual camera VC is displayed as a blurred image, the user feels unnaturalness that may hinder the gameplay and ruin the game balance. Thus, the distance LD2 is set to be longer than 3 m that is a distance of the far side position of the distance range DRG1. For example, the distance LD2 is set while taking the game balance and the like into consideration. Then, the blurring process is performed on a display object in the distance range DRG2 that starts from the position of the distance LD2, to prevent 3D sickness. With this configuration, prevention of 3D sickness and favorable game balance adjustment can both be achieved.

4.3 Blurring Process Skipping Process, Visibility Enhancing Process

In the present embodiment, the blurring process is skipped for a predetermined display object in the distance range DRG2 farther than the distance range DRG1, or is performed on the predetermined display object but with a lower blurring level. Specifically, a blurring process skipping process is performed on the predetermined display object.

Figures 19A, 19B:
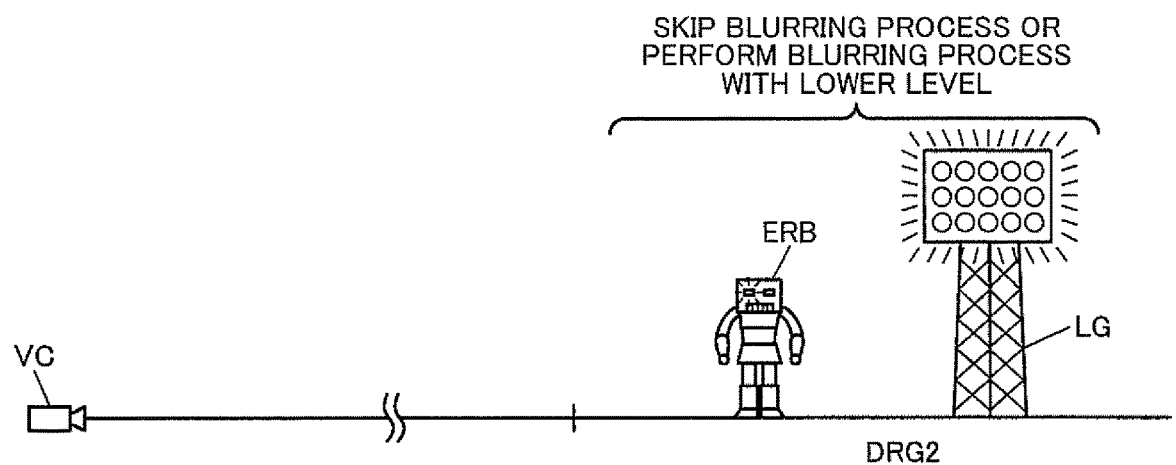
FIG. 19A and FIG. 19B are diagrams illustrating a method of skipping the image effect process or lowering the effect level for a display object in a far distance range.

For example, in FIG. 19A, the enemy robot ERB is positioned in the distance range DRG2, but is an important display object to be gazed at by the user. Thus, the blurring process is skipped for the enemy robot ERB, or is performed on the enemy robot ERB with a blurring level lower than that of the blurring process performed on the other display object in the distance range DRG2. As a result, the enemy robot ERB can be visually recognized clearly by the user, even when the enemy robot ERB is positioned in the far distance range DRG2, whereby smooth gameplay by the user can be achieved.

A lighting tower LG and the enemy robot ERB positioned in the distance range DRG2 respectively have an illumination part and an eye part emitting light, which is preferably not weakened by the blurring process. Thus, in such a case, the blurring level of the blurring process is set to be low for the light emitting part such as the illumination part of the lighting tower LG and the eye part of the enemy robot ERB. In an example where the image effect process is the fog process, a fog density is lowered for the light emitting parts such as the illumination part of the lighting tower LG and the eye part of the enemy robot ERB so that these parts are blurred lightly as much as possible. Thus, an appropriate image appropriately expressing flashing of the light emitting part can be obtained.

For example, in the fog process, a parameter for adjusting fogginess of each display object is prepared. Thus, for the light emitting part such as the illumination part of the lighting tower LG and/or the eye part of the enemy robot ERB, the fogginess can be adjusted through adjustment of the parameter to lower the blurring level. Various display objects may be contemplated as a display object for which the blurring process is skipped or for which the blurring level is lowered. For example, preferably, the blurring process is skipped or the blurring level is lowered for a display object that is anticipated to be important in the game, a display object such as cross hairs (gunsight), and a display object that provides a predetermined effect such as flashing, exploding, and impact.

In the present embodiment, for a predetermined display object in the distance range DRG2 farther than the distance range DRG1, a process of enhancing the visibility over the other display object in the range may be performed. For example, as a process of enhancing visibility, the size change process, the luminance change process, the color tone change process, or the depth value change process is performed on the predetermined display object.

For example, in table information illustrated in FIG. 19B, a visibility enhancing flag is set in association with each display object. For example, the visibility enhancing process is performed on a display object that is positioned in the distance range DRG2 and is associated with the visibility enhancing flag set to 1. The visibility enhancing process is a process of making a display object more easily visually recognizable by the user compared with a normal state without the process.

Figure 20:
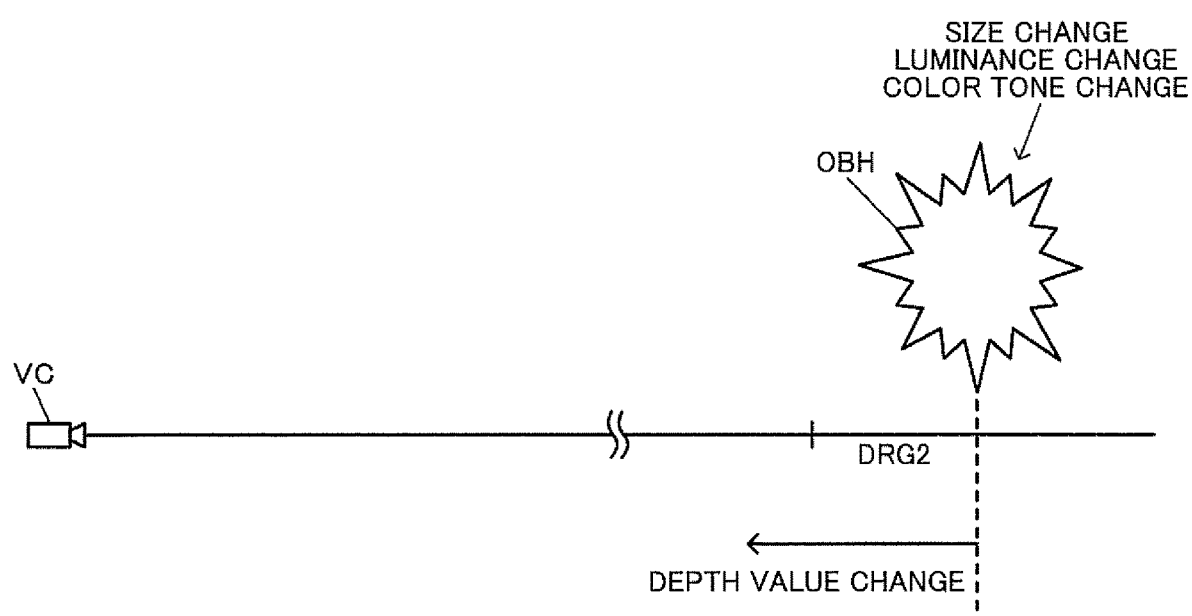
FIG. 20 is a diagram illustrating a process of enhancing visibility of a display object in the far distance range.

For example, in FIG. 20, a display object OBH that provides an explosion effect is positioned in the distance range DRG2. In such a case, for example, the size of the display object OBH is increased from that in the normal state, luminance (luminance of the explosion effect) of the display object OBH is enhanced from that in the normal state, or the color tone (the color tone of the explosion effect) of the display object OBH is changed to a more noticeable color tone. With this configuration, the display object OBH positioned in the distance range DRG2 that has been subjected to the blurring process can have the visibility enhanced with the size, luminance, or color tone of the display object OBH changed. Thus, the explosion effect of the display object OBH can be prevented from failing to be sufficiently visually recognized by the user.

Alternatively, the depth value (Z value, depth distance) of the display object OBH may be changed. For example, the depth value is changed so that the display object OBH is positioned to be more on the near side of the virtual camera VC than the distance range DRG2. With this configuration, the display object OBH is not subjected to the blurring process, and thus can have enhanced visibility for the user.

When an image effect process in which a blurring level changes in accordance with a distance is performed for example, the display object OBH has the depth value changed to be on the near side of the virtual camera VC so that the blurring level can be lowered, and thus can have the visibility enhanced. Various display objects can be contemplated as the display object to be the target of the visibility enhancing process. For example, the visibility enhancing process is preferably performed for a display object that is anticipated to be important in the game, a display object such as cross hairs, and a display object that provides a predetermined effect such as flashing, exploding, and impact.

4.4 Setting Image Effect Process to be ON or OFF, Effect Level Setting, and the Like In the present embodiment, the tracking information for the point-of-view information about the user is acquired, and the position and/or the orientation of the virtual camera VC is changed based on the tracking information acquired. Here, the position and the orientation of the virtual camera VC respectively correspond to a point-of-view position CVP and the line-of-sight direction CVL.

Figure 21A:
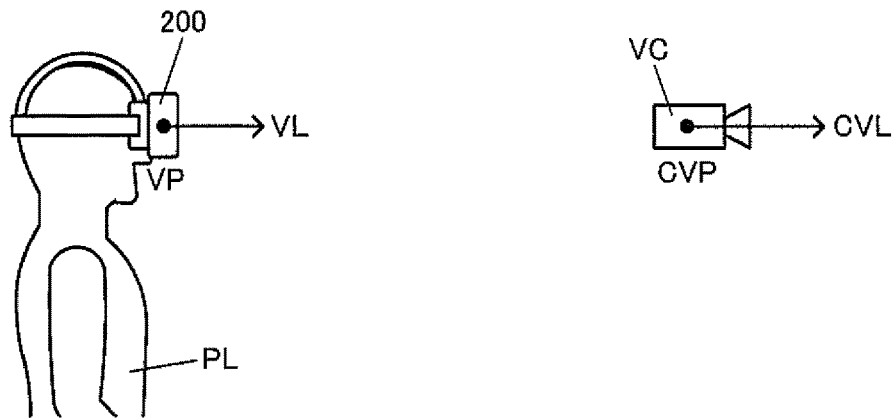
FIG. 21A to FIG. 21C are diagrams illustrating a method of changing the position and/or the orientation of the virtual camera based on tracking information.
Figure 21B:
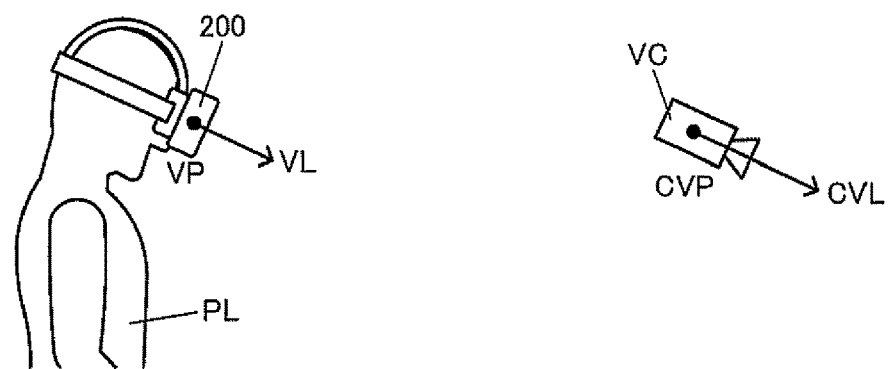
Figure 21C:
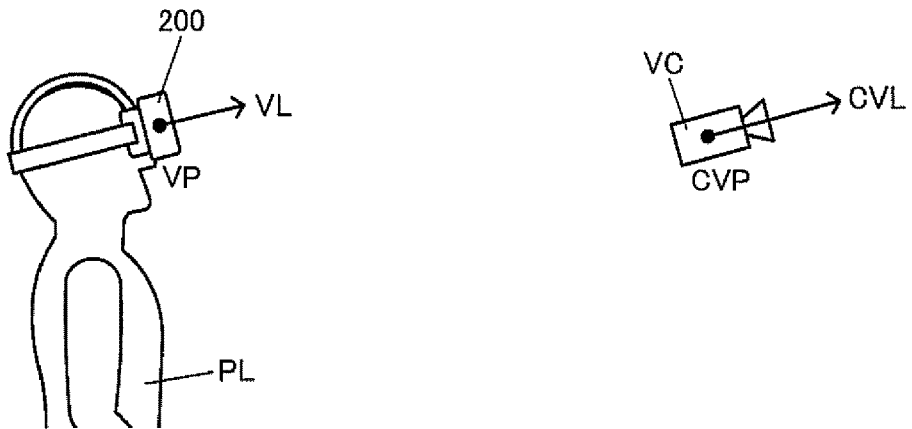

For example, as illustrated in FIG. 21A to FIG. 21C, when the user PL in the real world moves a line-of-sight direction VL (head) downward or upward, the tracking information (point-of-view tracking information) for the point-of-view information about the user PL is acquired through the tracking process for the HMD 200 for example. Then, the point-of-view position CVP and/or the line-of-sight direction CVL of the virtual camera VC is set based on the acquired tracking information (information identifying the point-of-view position and/or the line-of-sight direction of the user) to change the position and/or the orientation of the virtual camera VC as illustrated in FIG. 21A to FIG. 21C. For example, as illustrated in FIG. 21B, the line-of-sight direction CVL of the virtual camera VC is directed downward when the line-of-sight direction VL of the user PL is directed downward. For example, as illustrated in FIG. 21C, the line-of-sight direction CVL of the virtual camera VC is directed upward when the line-of-sight direction VL of the user PL is directed upward. With this configuration, when the user PL in the real world changes the point-of-view position VP and/or the line-of-sight direction VL, the point-of-view position CVP and/or the line-of-sight direction CVL of the virtual camera VC changes accordingly. Thus, the virtual camera VC behaves like the actual first person point-of-view of the user PL, whereby improved virtual reality can be provided.

On the other hand, the point-of-view position and the line-of-sight direction of the virtual camera also changes in accordance with the movement status of the moving body that moves in the virtual space. The moving body is a virtual user (a character such as a skier for example) in the virtual space corresponding to the user, a ridden moving body (a car or a robot for example) ridden by the virtual user, or the like.

Figure 22A:
FIG. 22A to FIG. 22C are diagrams illustrating an event where a character collides with a rock to have the traveling direction or the like changed.
Figure 22B:
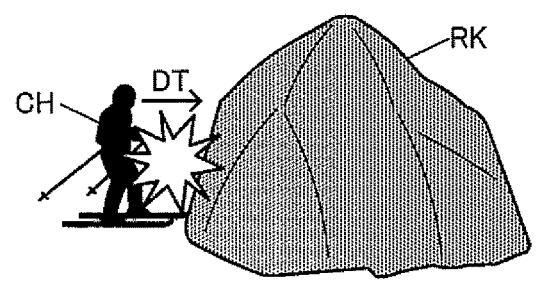

For example, FIG. 22A illustrates a state where a rock RK (possible collision object) is in front of (in the traveling direction) of the character CH that is the moving body. FIG. 22B illustrates collision between the character CH hand the rock RK. As a result, a traveling direction DT of the character CH is changed as illustrated in FIG. 22. Such a process of changing the traveling direction DT can be implemented through a calculation process for the collision between the character CH and the rock RK for example. This collision calculation process can be implemented with a physics process based on reaction force received by the character CH as a result of the collision with the rock RK. For example, the physics process is performed to change the traveling direction DT of the character CH as illustrated in FIG. 22C in accordance with the reaction force received as a result of the collision in FIG. 22B.

A large change in the traveling direction DT of the character CH as a result of such collision with the rock RK results in a large change in the display image of the HMD. The large change in the display image of the HMD results in a problem such as 3D sickness for example.

Figure 22C:
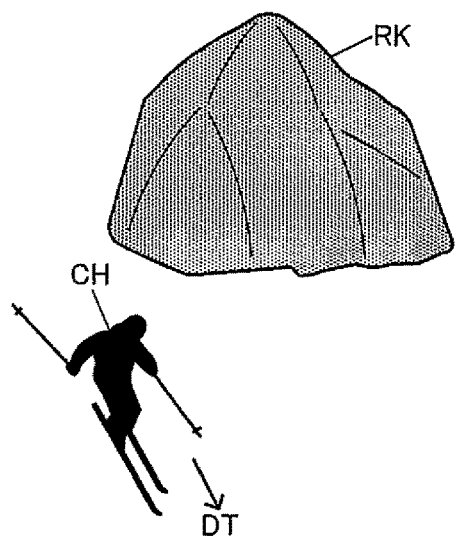

For example, a large change in the traveling direction DT of the character CH as illustrated in FIG. 22C as a result of the collision with the rock RK illustrated in FIG. 22B results in a large change in the line-of-sight direction and/or the point-of-view position of the virtual camera following the character CH. For example, in a case of the first person point-of-view, the virtual camera is set at the position of the point-of-view of the character CH, and the line-of-sight direction of the virtual camera is directed along the traveling direction DT of the character CH. Thus, the large change in the traveling direction DT as illustrated in FIG. 22C leads to a large change in the line-of-sight direction and/or the point-of-view position of the virtual camera, resulting in a large change in the display image of the HMD.

Such a sharp change in the display image of the HMD due to the collision event is a virtual event in the virtual space (virtual collision), and thus has discrepancy from the event in the real world. Such a sharp change in the display image of the HMD deviated from the real world will result in the user feeling 3D sickness.

In such a case, the movable casing 40 in FIG. 4 or 8 may be operated, at the time of collision with the rock as illustrated in FIG. 22B for example, to make the user feel the reaction force due to the collision, and thus the discrepancy between the real world and the virtual world can be reduced to alleviate the 3D sickness felt by the user. For example, the air spring sections 50 to 53 in FIG. 8 may be slightly extended and contracted so that the user can somewhat feel the vibrations due to the collision with the rock.

However, the collision can be virtually experienced using the movable casing 40 but is only for a limited level, and thus there is huge discrepancy between the sharp change in the image of the virtual world displayed on the HMD and the perception of the user in the real world. Specifically, while the user in the real world did not actually collide with the rock, only the image of the virtual world largely fluctuates due to the collision with the rock. When such an event frequently occurs, the user will feel 3D sickness or the like.

Figures 23, 24:
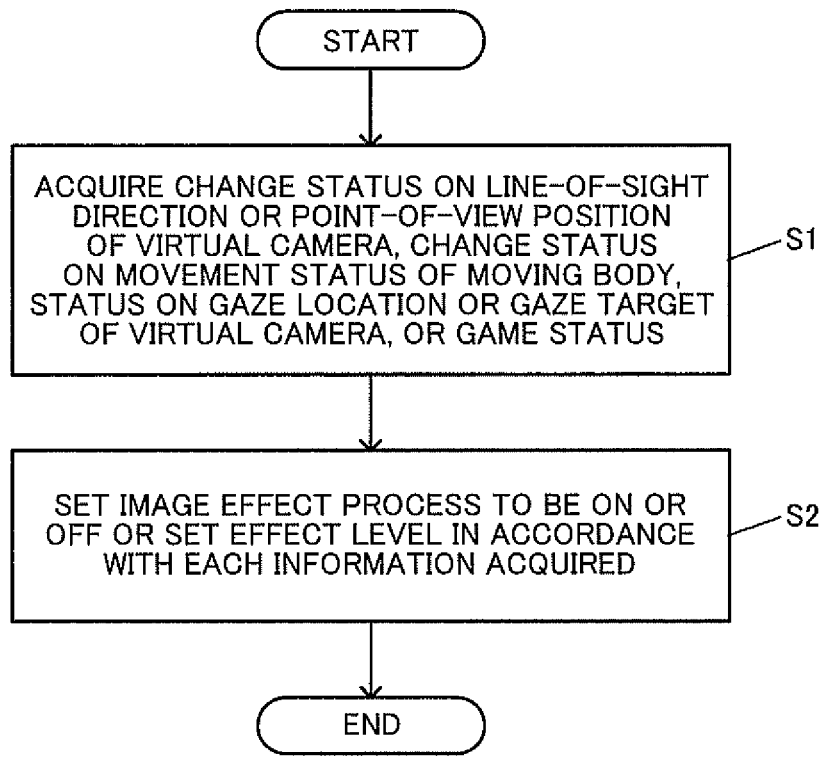
FIG. 23 is a flowchart illustrating a process of setting the image effect process to be ON or OFF or changing the effect level in accordance with each event.
FIG. 24 is a diagram illustrating a method of setting the image effect process to be ON or OFF or setting the effect level in accordance with each event.

Thus, in the present embodiment, a method is employed in which various statuses of the virtual camera, the moving body, and the like are determined, and setting the image effect process to be ON or OFF or setting the effect level of the image effect process is performed based on the status. FIG. 23 is a flowchart illustrating a process in this method.

For example, a change status on the line-of-sight direction or point-of-view position of the virtual camera, a change status on the movement status of the moving body, a status on the gaze location or gaze target of the virtual camera, or the game status is acquired (step S1). For example, as illustrated in FIG. 22A to FIG. 22C, when an event occurs where the line-of-sight direction and/or the point-of-view position of the virtual camera changes, or the movement status of the moving body changes, information about such an event is acquired. Alternatively, information indicating whether or not the gaze location or gaze target of the virtual camera is likely to cause motion sickness is acquired. Alternatively, information indicating whether or not the game status is likely to cause 3D sickness is acquired. Then, the image effect process is set to be ON or OFF, or the effect level is set in accordance with each information acquired (step S2).

For example, in a situation where the line-of-sight direction or point-of-view position of the virtual camera and/or the movement status (speed, acceleration) of the moving body largely changes, the image effect process for motion sickness prevention is turned ON and is otherwise turned OFF. For example, the image effect process is turned ON in response to the situation that largely changes the traveling direction DT of the character CH that is a moving body as illustrated in FIG. 22C. Alternatively, the effect level is set in accordance with a change amount of the line-of-sight direction or point-of-view position of the virtual camera, the speed or acceleration of the moving body, or the like. For example, the effect level, such as a blurring level, is set to be higher for a large change amount. The image effect process is turned ON in a situation that is likely to cause 3D sickness, such as a situation where the scene in the direction of the virtual camera includes a large number of display objects displayed. The image effect process is turned OFF in a situation that is not likely to cause 3D sickness such as a situation where almost no display object is displayed. Alternatively, the effect level of the image effect process may be changed in accordance with the number of display objects at the gaze location and the like. Alternatively, the image effect process is turned ON when the game status such as a game progress status, a game stage status, or a performance status is likely to cause the sickness, and is otherwise turned OFF.

For example, in table information illustrated in FIG. 24, each case is associated with an image effect process ON/OFF flag and a parameter of the effect level. In a case CA1 in FIG. 24, the image effect process is set to be ON, and the effect level is set to be EF1. In a case CA2, the image effect process is set to be ON, and the effect level is set to be EF2. The effect levels EF1 and EF2 are parameters for setting the blurring level of the blurring process as the image effect process. In cases CA3 or CA4, the image effect process is set to be OFF.

The status of the virtual camera and the moving body with which the image effect process is set to be ON is a status that results in or is expected to result in a sharp change in the line-of-sight direction and/or the point-of-view position of the virtual camera, and/or in the speed, acceleration, and the like of the moving body, for example. Specifically, it is a situation that is likely to cause 3D sickness. Examples of such situation include collision with the rock as illustrated in FIG. 22A to FIG. 22C, spinning due to overspeeding, sliding down a slope sharply, or falling from a cliff.

In the present embodiment, the image effect process may be set to be ON or OFF, and the effect level of the image effect process may be set in accordance with the play level (gameplay level) of the user.

Figures 25, 26:
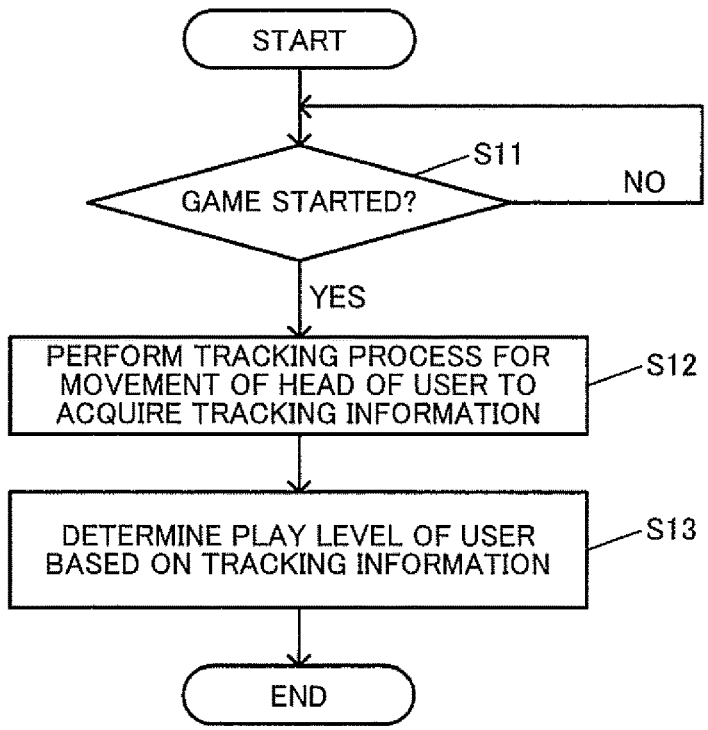
FIG. 25 is a diagram illustrating a method of setting the image effect process to be ON or OFF or setting the effect level in accordance with a play level of a user.
FIG. 26 is a flowchart illustrating a process of determining the play level based on tracking information about the head of the user.

For example, in table information illustrated in FIG. 25, an image effect process ON/OFF flag and an effect level parameter are associated with each play level of the user. For example, for the users with play levels of beginner, elementary level, pre-intermediate, intermediate, and upper intermediate, the image effect process is set to be ON and the effect level is respectively set to be EFA, EFB, EFC, EFD, and EFE. The effect level is set to be the highest with the effect level EFA for the beginner, and is set to be the lowest with the effect level EFE for the upper intermediate user. When the effect level is the blurring level of the blurring process, the blurring level is set to be the highest for the beginner and is set to be lowest for the upper intermediate user. Thus, the beginner and the like who are unfamiliar with the game can be prevented from feeling 3D sickness. For the users with play levels of skilled and expert, the image effect process is set to be OFF. Thus, the user who is familiar with the game and thus is less likely to feel 3D sickness can play the game while viewing a realistic game image with no blurring process performed on display objects.

The play level of the user can be determined based on tracking information obtained by tracking the movement of the head of the user, the play history information about the user, and the like.

FIG. 26 is a flowchart illustrating a process of determining the play level based on the tracking information. First of all, whether or not the game has started is determined (step S11). When the game has started, a tracking process is performed on the movement of the head of the user to acquire the tracking information (step S12). Specifically, the tracking process for the HMD as described above with reference to FIG. 2A to FIG. 3B is performed to acquire the tracking information for identifying the line-of-sight direction and/or the point-of-view position of the user. Then, the play level of the user is determined based on the tracking information thus acquired (step S13).

For example, a beginner or an elementary level user tends not to move his or her head, on which the HMD is mounted, after the game has started. On the other hand, a skilled user tends to move his or her head frequently to see various locations at the early stage of the game. In this context, the play level of the user can be determined based on the tracking information about the movement of the head of the user.

Figure 27:
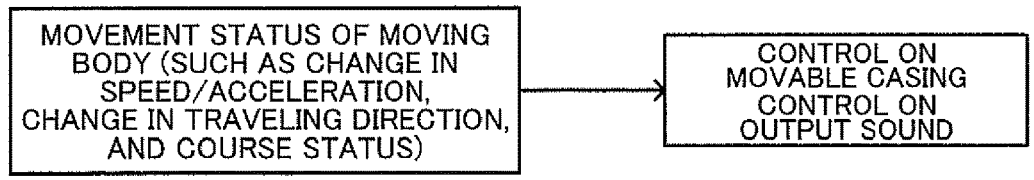
FIG. 27 is a diagram illustrating a method of controlling the movable casing and output sound.

In the present embodiment, the movable casing 40 illustrated with reference to FIG. 4, FIG. 8, and the like may change the play position of the user, in accordance with the movement status of the moving body as illustrated in FIG. 27. For example, the movable casing 40 changes the play position of the user in accordance with a change in the speed or acceleration of the moving body, a change in the traveling direction of the moving body, the status (condition) of the course on which the moving body moves, and the like. Alternatively, the output sound may be controlled in accordance with the movement status of the moving body. For example, sound corresponding to a change in the speed or acceleration of the moving body, sound corresponding to a change in the traveling direction of the moving body and output sound corresponding to the status of the course on which the moving body moves are generated.

For example, when the traveling direction of the moving body (such as a robot or a character) in the virtual space is directed downward on a downhill course, the movable casing 40 is controlled so that the orientation of the user in the real space is pitched forward. For example, in an example illustrated in FIG. 4 and FIG. 7A, the orientation change is implemented so that the user leans forward, in accordance with orientation change corresponding to pitching toward the forward direction about the X axis by the base section 452. In an example illustrated in FIG. 8, the rear air spring sections 50 and 52 are extended, whereas the front air spring sections 51 and 53 are contracted. Furthermore, output sound (for example, wind sound) is output to make the user feel that he or she is moving down the downhill course for example. When the traveling direction of the moving body in the virtual space is directed upward on an uphill course, the movable casing 40 is controlled to implement backward pitching for the orientation of the user in the real space. In an example illustrated in FIG. 4, the orientation change is implemented so that the user leans backward, in accordance with orientation change corresponding to pitching toward the backward direction about the X axis by the base section 452. In an example illustrated in FIG. 8, the rear air spring section 50 and 52 are contracted, whereas the front air spring sections 51 and 53 are extended. For example, output sound that makes the user feel that he or she is climbing the uphill course is output.

If the course is a bumpy road with bumps, the movable casing 40 is controlled so that the play position of the user is vertically shaken. In an example illustrated in FIG. 4 and FIG. 7A, the electric cylinders 413 and 414 are extended and contracted with small strokes. In the example illustrated in FIG. 8, the air spring sections 50 to 52 are vertically extended and contracted with small strokes. Furthermore, output sound indicating the bumpy road is output.

With the movable casing 40 and the output sound thus controlled, the movement status (a change in the acceleration or speed, a change in the traveling direction, and the status of the course) of the moving body in the virtual space can be felt by the user using the movable casing 40 and/or the output sound. For example, the movement status of the moving body can be felt by a change in the play position by using the movable casing 40 or can be aurally recognized by a change in the output sound. Thus, the feeling and hearing status of the user in the real world somewhat matches the status of the moving body and the course in the virtual world, so that a risk of the user feeling 3D sickness can be reduced. For example, a change in the movement status of the moving body in the virtual space with no change in the play position achieved by using the movable casing 40 and/or in the output sound results in mismatch between the feeling and hearing status of the user and the status of the virtual space. Such a situation, which may result in 3D sickness, can be prevented by the method according to the present embodiment illustrated in FIG. 27.

In the present embodiment, the image effect process may be set to be ON or OFF and the effect level of the image effect process may be set based on the information set by the user or the play history information about the user.

Figure 28:
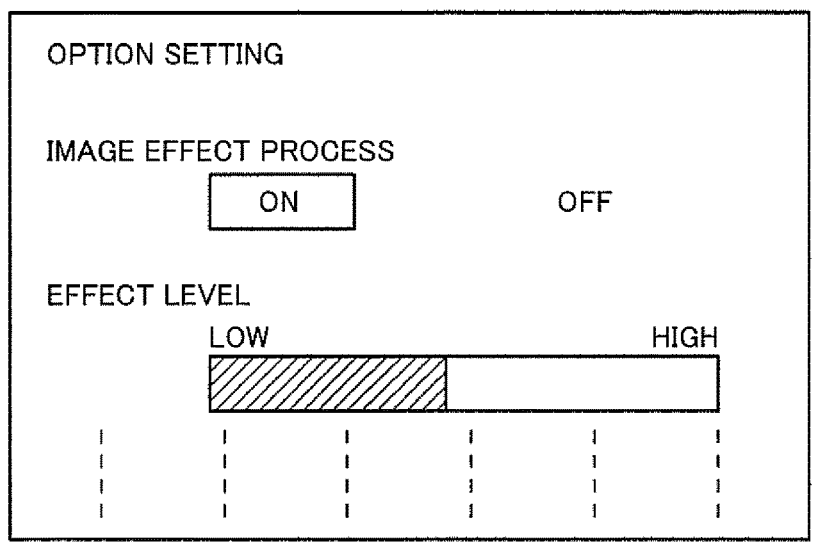
FIG. 28 is a diagram illustrating a method of setting the image effect process to be ON or OFF or setting the effect level in accordance with information set by the user.

For example, FIG. 28 illustrates an example of an option setting screen used by the user for setting various options for a game. On the option setting screen, the user can set the image effect process to be ON or OFF, and can set the effect level. For example, the image effect process is set to be ON and the effect level is set to be high for the user who is likely to feel 3D sickness. Thus, the blurring process is performed on a distant display object with a high blurring level, whereby such a user can be effectively prevented from feeling 3D sickness. On the other hand, for the user who is less likely to feel 3D sickness, the image effect process is set to be OFF or is set to be ON but with the effect level set to be low. Thus, such a user can enjoy the game with a more realistic setting.

Figure 29:
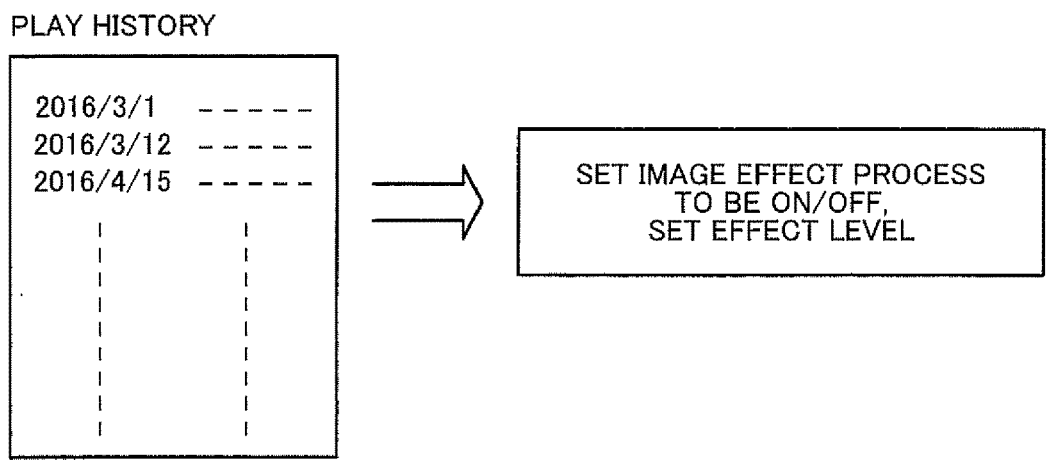
FIG. 29 is a diagram illustrating a method of setting the image effect process to be ON or OFF or setting the effect level based on play history information about the user.

In FIG. 29, the image effect process is set to be ON or OFF, and/or the effect level is set based on the play history information about the user. For example, the image effect process is set to be ON and the effect level is set to be high for a user determined to have a low play level or a user that is determined to have frequently caused an event such as collision, sudden acceleration, overturning, and falling based on the play history information about the user. Thus, the image effect process and the effect level are automatically and respectively set to be ON and high for an elementary level user or a user determined to be an elementary level, or a user determined to be unfamiliar with the gameplay. Thus, such a user can be effectively prevented from feeling 3D sickness. On the other hand, the user determined to be a skilled player or a user determined to be familiar with the gameplay is determined to be less likely to feel 3D sickness, and the image effect process is set to be OFF or is set to be ON but with low effect level. Thus, such a user can enjoy the game with a more realistic setting. The play history information is stored in the portable information storage medium 195 (such as an IC card) in FIG. 1, and the image effect process is set to be ON or OFF and the effect level is set based on the play history information from the portable information storage medium 195. Alternatively, the play history information about the user may be downloaded from an external server.

4.5 Process Example

Figure 30:
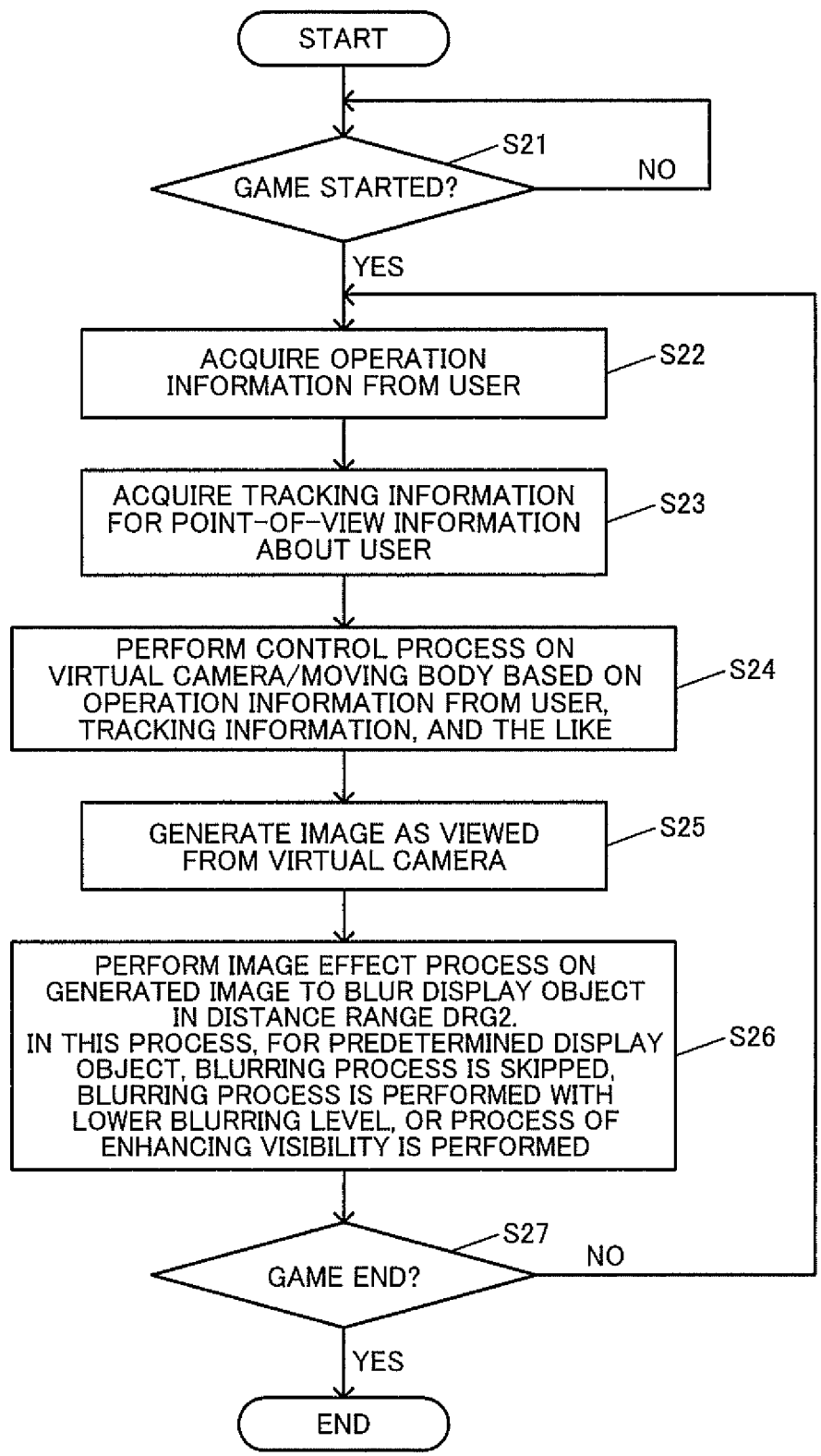
FIG. 30 is a flowchart illustrating a detailed process example according to the present embodiment.

Next, an example of the process according to the present embodiment is described with reference to a flowchart in FIG. 30.

First of all, whether or not the game has started is determined (step S21). When the game is determined to have been started, operation information from the user is acquired (step S22). For example, the operation information about the user input through the operation section 160 in FIG. 1 is acquired. Then, tracking information for the point-of-view information about the user is acquired (step S23). For example, the tracking information obtained through the tracking process described with reference to FIG. 2A to FIG. 3B is acquired. The control process for the virtual camera and the moving body is implemented based on the operation information from the user, the tracking information, and the like (step S24). For example, a process of moving the moving body such as a robot or a character is performed based on the operation information from the user, and the line-of-sight direction and the point-of-view position of the virtual camera are changed to follow the moving body. The control to set the line-of-sight direction and/or the point-of-view position of the virtual camera is performed based on the tracking information.

Next, a rendering process is performed to generate an image as viewed from the virtual camera (step S25). For example, left-eye and right-eye images for stereoscopy are generated as the image as viewed from the virtual camera. Then, the image effect process of blurring a display object in the distance range DRG2 as illustrated in FIG. 12 is performed on the image thus generated (step S26). In this process, as described above with reference to FIG. 19A to FIG. 20, for a predetermined display object, the blurring process is skipped or is performed but with a low blurring level, or the process of enhancing the visibility is performed. Thus, the image that is less likely to cause 3D sickness can be generated and displayed on the HMD of the user while with the game balance favorably adjusted.

Although the present embodiment has been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, each the terms (such as a character or a robot) that are at least once written together with a term (such as a moving body) of a wider sense or an alternative term in the specification or the figures can be replaced with the alternative term at any part of the specification or the figures. The process of moving the moving body, the process of controlling (process of setting) the virtual camera, the image effect process, the depth of field process, the fog process, the distance range setting process, visibility enhancing process, and process of setting the image effect to be ON or OFF or setting the effect level, and the like are not limited to those described in the present embodiment, and methods, processes, and configurations equivalent thereto are included in the scope of the disclosure. The embodiments can be applied to various games. The embodiments can be applied to various simulation systems such as an arcade game apparatus, a consumer game apparatus, a large attraction system where a large number of users play the game, and the like.

What is claimed is:

1. A simulation system comprising:
a processor including hardware, the processor being configured to perform:
    a moving body process of performing a process of moving a virtual moving body corresponding to a user wearing a head mounted display in a virtual space, the head mounted display having an eyepiece and a display, the head mounted display displays a left-eye image corresponding to a left eye of the eyepiece and displays a right-eye image corresponding to a right eye of the eyepiece;
    a virtual camera control process of controlling a virtual camera moving in accordance with a movement of the moving body; and
    a display process of generating an image as viewed from the virtual camera in the virtual space as a display image of the head mounted display, the display process including:
        a depth of field process as an image effect process for motion sickness prevention, and
        a blurring process of the depth of field process blurring, compared with a first display object in a first distance range from the virtual camera, an image of a second display object in a second distance range farther than the first distance range from the virtual camera to generate the display image, the blurring process only blurring the second display object in the second distance range without blurring any display object, including the first display object, located closer to the virtual camera than the second distance range, wherein:
    an in-focus range of a depth of field in the depth of field process includes the first distance range, the first distance range being set by a virtual visual distance that is between the virtual camera and a virtual screen, the virtual visual distance being set based on positions of the eyepiece and the display,
    the display image generated in the display process includes (i) an image of the first display object located at the virtual screen in the first distance range that has no parallax between the left eye image and the right eye image, and (ii) the image of the second display object in the second distance range that has parallax between the left eye image and the right eye image and is more blurred by the blurring process as compared with the image of the first display object, and
    the in-focus range of the depth of field in the depth of field process does not include the second distance range.

2. The simulation system as defined in claim 1, wherein in the display process, the processor performs the depth of field process in which the first distance range is included in the in-focus range of the depth of field, and the blurring process is not performed in a region more on a near side than the in-focus range as viewed from the virtual camera and is performed in a region more on a far side than the in-focus range.

3. The simulation system as defined in claim 1, wherein in the display process, the processor performs changing a width of the in-focus range of the depth of field in accordance with a movement status of the moving body.

4. The simulation system as defined in claim 1, wherein in the display process, the processor performs the depth of field process and a fog process as the image effect process.

5. The simulation system as defined in claim 1, wherein in the display process, the processor performs the image effect process in which the blurring process is not performed on a display object determined to be intersecting with a line segment with a given length extending in the line-of-sight direction from the virtual camera in a process of determining whether collision with the line segment has occurred, and the blurring process is performed on other display objects.

6. The simulation system as defined in claim 1, wherein the first distance range is a range of distance between 0.75 m and 3.5 m from the virtual camera.

7. The simulation system as defined in claim 1, wherein in the display process, the processor performs skipping the blurring process on a predetermined display object in the second distance range further than the first distance range, or performing the blurring process on the predetermined display object with a blurring level lower than a blurring level of the blurring process on other display objects in second distance range.

8. The simulation system as defined in claim 1, wherein in the display process, the processor performs a process of enhancing visibility of a predetermined display object in the distance range farther than the given distance range to be higher than visibility of other display objects in the distance range.

9. The simulation system as defined in claim 8, wherein in the display process, the processor performs, as the process of enhancing visibility, at least one of a size change process, a luminance change process, a color tone change process, and a depth value change process on the predetermined display object.

10. The simulation system as defined in claim 1, wherein the processor is configured to perform an input process of acquiring tracking information for point-of-view information about the user wearing the head mounted display, and
in the virtual camera control process, the processor performs changing a position or orientation of the virtual camera based on the tracking information.

11. The simulation system as defined in claim 1, wherein in the display process, the processor performs setting the image effect process to be ON or OFF or setting an effect level of the image effect process, based on a status on a change in a line-of-sight direction or point-of-view position of the virtual camera, a status on a change in a movement status of the moving body, a status on a gaze location or a gaze target of the virtual camera, or a game status.

12. The simulation system as defined in claim 1, wherein in the display process, the processor performs setting the image effect process to be ON or OFF or setting an effect level of the image effect process based on a play level of the user.

13. The simulation system as defined in claim 12, wherein the play level of the user is determined based on tracking information obtained by tracking a movement of a head of the user or play history information about the user.

14. The simulation system as defined in claim 1, wherein in the display process, the processor performs setting the image effect process to be ON or OFF or setting an effect level of the image effect process based on information set by the user or play history information about the user.

15. The simulation system as defined in claim 1 further comprising
a movable casing configured to change a play position of the user in accordance with a movement status of the moving body.

16. The simulation system as defined in claim 1, wherein in the display process, the processor performs the depth of field process constantly in a game period between a timing at which an image of a game stage displayed with the moving body appeared on the game stage and an end of a game.

17. A processing method comprising:
performing a moving body process of performing a process of moving a virtual moving body corresponding to a user wearing a head mounted display in a virtual space, the head mounted display having an eyepiece and a display, the head mounted display displays a left-eye image corresponding to a left eye of the eyepiece and displays a right-eye image corresponding to a right eye of the eyepiece;
performing a virtual camera control process of controlling a virtual camera moving in accordance with a movement of the moving body; and
performing a display process of generating an image as viewed from the virtual camera in the virtual space as a display image of the head mounted display, the display process including:
performing a depth of field process as an image effect process for motion sickness prevention, and a blurring process of the depth of field process blurring, compared with a first display object in a first distance range from the virtual camera, an image of a second display object in a second distance range farther than the first distance range from the virtual camera to generate the display image, the blurring process only blurring the second display object in the second distance range without blurring any display object, including the first display object, located closer to the virtual camera than the second distance range, wherein:
an in-focus range of a depth of field in the depth of field process includes the first distance range, the first distance range being set by a virtual visual distance that is between the virtual camera and a virtual screen, the virtual visual distance being set based on positions of the eyepiece and the display,
the display image generated in the display process includes (i) an image of a the first display object located at the virtual screen in the first distance range that has no parallax between the left eye image and the right eye image, and (ii) the image of the second display object in the second distance range that has parallax between the left eye image and the right eye image and is more blurred by the blurring process as compared with the image of the first display object, and
the in-focus range of the depth of field in the depth of field process does not include the second distance range.

18. A non-transitory computer-readable information storage medium storing a program for causing a computer to perform steps comprising:
performing a moving body process of performing a process of moving a virtual moving body corresponding to a user wearing a head mounted display in a virtual space, the head mounted display having an eyepiece and a display, the head mounted display displays a left-eye image corresponding to a left eye of the eyepiece and displays a right-eye image corresponding to a right eye of the eyepiece;

performing a virtual camera control process of controlling a virtual camera moving in accordance with a movement of the moving body; and performing a display process of generating an image as viewed from the virtual camera in the virtual space as a display image of the head mounted display, the display process including:

performing a depth of field process as an image effect process for motion sickness prevention, and a blurring process of the depth of field process blurring, compared with a first display object in a first distance range from the virtual camera, an image of a second display object in a second distance range farther than the first distance range from the virtual camera to generate the display image, the blurring process only blurring the second display object in the second distance range without blurring any display object, including the first display object, located closer to the virtual camera than the second distance range, wherein:

an in-focus range of a depth of field in the depth of field process includes the first distance range, the first distance range being set by a virtual visual distance that is between the virtual camera and a virtual screen, the virtual visual distance being set based on positions of the eyepiece and the display, the display image generated in the display process includes (i) an image of a the first display object located at the virtual screen in the first distance range that has no parallax between the left eye image and the right eye image, and (ii) the image of the second display object in the second distance range that has parallax between the left eye image and the right eye image and is more blurred by the blurring process as compared with the image of the first display object, and the in-focus range of the depth of field in the depth of field process does not include the second distance range.

\* \* \* \* \*